United States Patent [19]

Harano et al.

[11] Patent Number: 4,652,743
[45] Date of Patent: Mar. 24, 1987

[54] OPTICAL IMAGE-READING APPARATUS

[75] Inventors: Tetsuo Harano, Inazawa; Eiichi Ohta, Handa, both of Japan

[73] Assignee: Brother Kogyo Kabushiki Kaisha, Aichi, Japan

[21] Appl. No.: 802,355

[22] Filed: Nov. 27, 1985

[30] Foreign Application Priority Data

| Nov. 30, 1984 | [JP] | Japan | 59-254792 |
| Nov. 30, 1984 | [JP] | Japan | 59-254793 |
| Dec. 3, 1984 | [JP] | Japan | 59-255543 |
| Dec. 4, 1984 | [JP] | Japan | 59-183928[U] |

[51] Int. Cl.$^4$ .......................... H01J 5/16; H04N 1/12
[52] U.S. Cl. .................................... 250/227; 250/234; 358/292; 358/293
[58] Field of Search ............... 250/227, 234, 235, 236; 358/209, 285, 292, 293, 294

[56] References Cited

U.S. PATENT DOCUMENTS

| 3,622,793 | 11/1971 | Dalton | 250/227 X |
| 4,266,250 | 5/1981 | Heinzl et al. | 358/293 X |
| 4,523,235 | 6/1985 | Rajchman | 358/294 X |

Primary Examiner—Eugene R. Laroche
Assistant Examiner—James C. Lee
Attorney, Agent, or Firm—Parkhurst & Oliff

[57] ABSTRACT

An optical reader with a reading head including first optical fibers for transmitting light beams from an emitter to emit light beams from their first ends to irradiate corresponding illumination spots on a medium, and further including second optical fibers having first ends which are located adjacent to the first ends of the respective first optical fibers and which receive the beams reflected from corresponding reflection spots on the medium, for transmitting the reflected beams to a light-sensitive device. The first and second optical fibers constitute plural reading units, and their first ends constitute their image-reading portions. The light-sensitive device produces a signal indicating a light reflectance in an overlapping spot where the illumination spot overlaps the reflection spot. The image-reading portions are spaced apart at a pitch sufficient to prevent the illumination spot of one of the reading units from overlapping the reflection spot of the adjacent reading unit. The reading head and the medium are moved relative to each other to move the overlapping spot to read the images on the medium. The light emitter and light-sensitive device are controlled so as to read each reading spot each time the moving overlapping spot is aligned with the reading spot.

18 Claims, 18 Drawing Figures

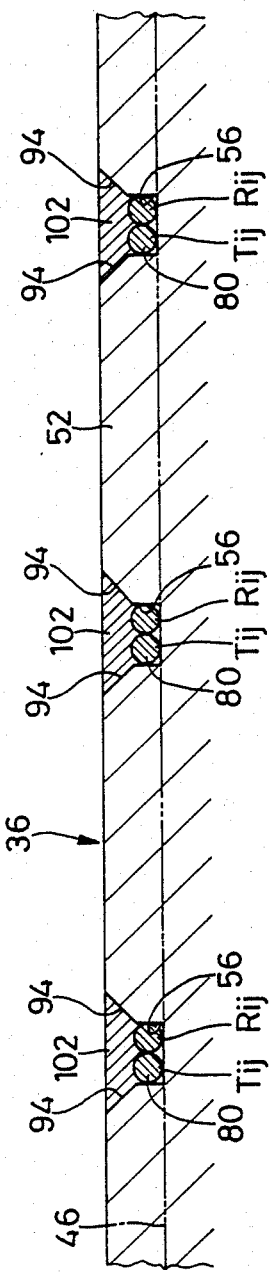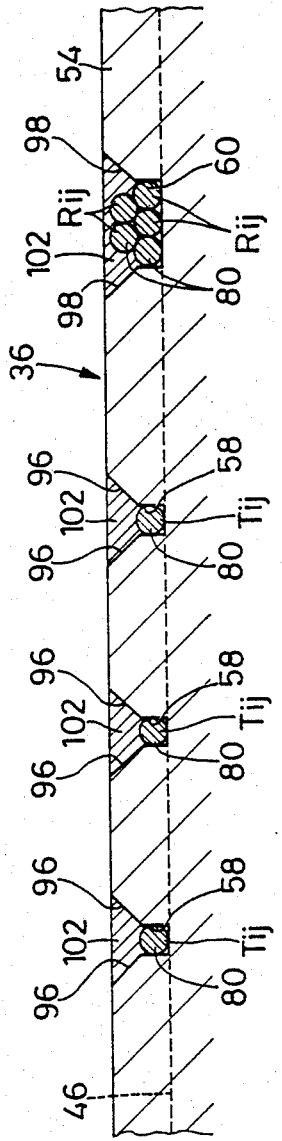

OPTICAL IMAGE-READING APPARATUS

BACKGROUND OF THE INVENTION

1. Field of the Art

The present invention relates generally to an optical reading apparatus for photoelectrically reading images on a recording medium, and more particularly to an optical reader of the type in which a beam of light emitted from a light emitter is transmitted through a light-emitting optical fiber and emitted therefrom to irradiate a reading spot on the surface of the recording medium, and the light beam reflected from the medium surface is transmitted through a light-receiving optical fiber to a light-sensitive element, an output of which is processed to provide an electric signal indicative of a reflectance of light in the reading spot on the medium.

2. Related Art Statement

One of the inventors named in the present application collaborated with another person to develop an optical reading apparatus of the above-indicated type, which is disclosed in U.S. patent application Ser. No. 726,314 which was filed Apr. 23, 1985 and was owned by the assignee of the present application at the time the present invention was made. In the disclosed optical reading apparatus, each reading unit is constituted by one light-emitting optical fiber and one light-receiving optical fiber. These two optical fibers are fixed on a reading head such that their ends positioned opposite to the surface of a recording medium are disposed adjacent to each other. For improved reading efficiency, the reading head has a plurality of such reading units. To assure an accurate reading of an image with a high resolution, the image-reading portions of those reading units opposite to the medium surface are spaced apart from each other at a pitch as small as possible.

In such an optical reader, it is required to read only a reading spot which is an overlapping area wherein an illumination spot irradiated by a light beam emitted from a light-emitting optical fiber overlaps a reflection spot within which a light beam reflected by the medium can be received by a light-receiving optical fiber. Namely, only the light beam reflected from the overlapping area (reading spot) should be received by the light-receiving optical fiber, in order to improve the reading resolution. In the optical reader as discussed above, however, it is inevitable that the reflection spot of a given light-receiving optical fiber overlaps the illumination spots of two or more light-emitting optical fibers. Therefore, if light beams are emitted from these plural light-emitting optical fibers at the same time, the light-receiving optical fiber in question receives light beams which is reflected from areas outside the corresponding reading spot. This leads to noises of an electric output of the reader, degrading its accuracy of reading. In view of this inconvenience, it is proposed to activate light-emitting elements corresponding to the light-emitting optical fibers, in a specially determined order as suggested in the above-identified U.S. Patent Application. However, this proposal requires a complicated control system, which inherently pushes up the cost of manufacture of the optical reading apparatus.

Further, a minimum pitch of the reading spots in the above apparatus is limited by diameters of a light-emitting optical fiber and the corresponding light-receiving optical fiber. To reduce the pitch, the reading head must use optical fibers having a reduced diameter. A reduction in diameter of the optical fibers used means an increased number of the optical fibers required, which requires an accordingly increased number of light-emitting elements and light-sensitive elements. This also results in an increase in the cost of manufacture of the reading apparatus. In addition, the optical fibers have their minimum diameter permissible for their intended function.

In the optical reading apparatus indicated above, the reading head is fed in an intermittent fashion. More specifically, the reading head reads all reading spots corresponding to the image-reading portions of all reading units on the reading head while the reading head is stopped at a given point on the medium. That is, the reading head is fed by a predetermined increment after the reading spots opposite to all image-reading portions have been read. In this connection, it will be understood that it is difficult to assure exact positioning of the reading head while permitting a high feed rate of the reading head. In this arrangement, therefore, it is impossible to increase the reading efficiency.

If it is desired to effect an image reading operation by using a reading head which covers a substantially entire width of a recording medium, the reading head must be equipped with a large number of reading units, that is, a large number of light-emitting elements, light-sensitive elements and control circuits therefor.

In the above case, the reading head requires a complicated structure for supporting the light-emitting and light-receiving optical fibers in a suitably fixed manner. Hence, the manufacturing cost is increased.

SUMMARY OF THE INVENTION

It is an object of the present invention to provide an optical reader permitting an improved level of reading resolution with a simple control, wherein a light-receiving optical fiber of each reading unit is adapted to receive a light beam which is emitted from only the corresponding light-emitting optical fiber and which is reflected from the surface of a recording medium.

Another object of the invention is the provision of an optical reader which is capable of reading images on the recording medium while its reading head is moved continuously relative to the medium.

A further object of the invention is to provide an optical reader which permits reading of a large number of reading spots, by using a comparatively small number of light-sensitive elements, each of which is assigned to receive reflected light beams from a plurality of light-receiving optical fibers.

A still further object of the invention is the provision of an optical reader with a reading head which has a relatively small number of reading units, but is able to cover a substantially entire width of a recording medium, and assure a comparatively high level of reading resolution.

An additional object of the invention is the provision of an optical reader having a reading head which is simple in construction and economical to manufacture.

Another object of the invention is to provide an optical reader which is simple in its control arrangement to control the activation of the light-emitting elements and to process electric signals from the light-sensitive elements, and which is economical to manufacture.

Yet another object of the invention is to provide an optical reader which has means for automatically adjusting a reading head in order to obtain image reading signals of the same level from all of the reading units when their image-reading portions receive light beams reflected from an area of a recording medium having the same reflectance of light.

According to the invention, there is provided an optical reader for photoelectrically reading images on a surface of a recording medium, comprising a medium support for supporting the recording medium, a reading head, driving means for moving the reading head and the recording medium relative to each other, and control means for controlling the operation of the reading head and the driving means. The reading head includes: (a) at least one light-emitting element, (b) at least one light-sensitive element, (c) a plurality of light-emitting optical fibers for transmitting beams of light from the at least one light-emitting element to emit the beams of light from their first ends to irradiate corresponding illumination spots on the surface of the recording medium, each of the first ends having a predetermined angle of radiation of light, and (d) a plurality of light-receiving optical fibers having first ends located adjacent to the first ends of the respective light-emitting optical fibers. The first ends of the light-receiving optical fibers have a predetermined angle of incidence of light and receiving the beams of light reflected from corresponding reflection spots on the surface of the recording medium. The light-receiving optical fibers transmits the reflected light beams to the at least one light-sensitive element. The light-emitting optical fibers and the light-receiving optical fibers cooperate to constitute a plurality of reading units, and the first ends of the light-emitting and light-receiving optical fibers cooperate to consitute a plurality of image-reading portions. The at least one light-sensitive element produces an electric signal representative of a reflectance of light in an overlapping spot in which the illumination spot of each of the reading units overlaps the reflection spot of the same reading unit. The image-reading portions of the reading units are spaced apart from each other along a straight line at a predetermined pitch sufficient to prevent the illumination spot of one of the reading units from overlapping the reflection spot of the reading unit adjacent to the above-indicated one reading unit. The driving means moves the reading head and the recording medium relative to each other so that a substantially entire area on the medium along the line of relative movemente is covered by the overlapping spot. The control means controls the at least one light-emitting element and the at least one light-sensitive element, to read each of reading spots on the recording medium each time the overlapping spot is aligned with one of the reading spots.

In the optical reader of the invention constructed as described above, the number of the reading units of the reading head is significantly reduced because the image-reading portions are not disposed in close proximity to each other, that is, the image-reading portions are spaced apart from each other at a pitch sufficient to prevent the illumination spot of one of the reading units from overlapping the reflection spot of the adjacent reading unit. Accordingly, the cost of the reading head may be reduced. Further, the pitch of the image-reading portions permits an improved image reading accuracy of the reading head.

In addition, the optical reader of the present invention permits the reading head to read the reading spots at a very small pitch, which may be smaller than the size of the overlapping spot of each reading unit. More specifically, the reading pitch is determined by a reading time interval and a rate of feed of the reading head in the reading direction relative to the recording medium. This is not possible in the arrangement of the previously identified U.S. Patent Application wherein the reading pitch is determined and fixed by a pitch of the adjacent image-reading portions, and can not be smaller than the overlapping spot of each image-reading portion.

According to one advantageous embodiment of the invention, the driving means comprises a first feeding device for moving the recording medium along a first axis, and a second feeding device for moving the reading head along a second axis perpendicular to the above-indicated one axis. The image-reading portions are spaced apart from each other along the second axis.

However, the principle of the present invention may be practiced even if the image-reading portions are disposed in spaced-apart relation along the first axis.

In one preferred arrangement of the above embodiment wherein the image-reading portions are disposed along the second axis, the first ends of the light-emitting and light-receiving optical fibers of each of the reading units are disposed in a direction parallel to the second axis. The predetermined pitch of the image-reading portions of the reading head is selected to be greater than a value q determined by the following formula:

$$q = 2r + 2l \cdot \tan(\alpha/2)$$

where, r: diameter of the light-emitting and light-receiving optical fibers l: distance between the first ends of the optical fibers and the surface of the recording medium $\alpha$: the angle of radiation or incidence of light of the first ends of the optical fibers.

In an alternative arrangement of the above embodiment, the first ends of the light-emitting and light-receiving optical fibers of each of the reading units are disposed in a direction parallel to the first axis along which the recording medium is moved. The predetermined pitch of the image-reading portions of the reading head is selected to be greater than a value q determined by the following formula:

$$q = \sqrt{[r + 2l \cdot \tan(\alpha/2)]^2 - r^2}$$

In the above arrangement, the pitch of the image-reading portions may be made smaller than in the preceding arrangement.

According to a further preferred arrangement of the same embodiment, the second feeding device moves the reading head at a constant rate over at least a predetermined distance along the second axis. The at least one light-emitting element consists of a plurality of light-emitting elements which are positioned opposite to second ends of the corresponding light-emitting optical fibers which have the first ends opposite to the surface of the recording medium. The at least one light-sensitive element consists of a single light-sensitive element which is positioned opposite to second ends of all of the light-receiving optical fibers which have the first ends opposite to the surface of the recording medium. The predetermined pitch of the image-reading portions of the reading head is determined by the following formula:

$$p = a/N - 1/xN$$

where,
- a: number of the overlapping spots which is formed by each image-reading portion while the reading head is moved over the predetermined distance
- 1/N: size of the overlapping spot along the second axis (N=number of the overlapping spots per unit distance)
- x: number of the light-receiving optical fibers opposite to the single light-sensitive element In this instance, one of the image-reading portions of the reading head reads one of the reading spots sequentially each time the reading head is moved by a distance of 1/xN.

In the above arrangement, one of the image-reading portions is aligned with one of the reading spots each time the reading head is moved by a distance equal to the pitch of the image-reading portions. Therefore, the successive reading spots are read by the image-reading portions while the reading head is moved at a constant rate.

In one form of the above preferred arrangement, the reading head may comprise a plurality of groups of the reading units each unit having the single light-sensitive element opposite to the second ends of the light-receiving optical fibers. These groups of reading units are disposed along the second axis. The corresponding image-reading portions of the groups of reading units read the respective reading spots each time the reading head is moved by the distance of 1/xN.

In another form of the above arrangement, the second feeding device may comprise: a carrier supporting the reading head and movable along the second axis; a cam rotatably supported by a stationary member; a drive motor for rotating the cam; and a cam follower attached to the carrier and movable with the carrier. The cam has a profile which enables the carrier to effect reciprocating motions including a motion of the predetermined distance at the constant rate.

In the above form of the invention, the control means may comprise: a rotary disk rotatable with the cam and having a plurality of slits which are formed in spaced-apart relation with each other in a circumferential direction of the rotary disk; and a photoelectric sensor disposed in the proximity of the rotary disk and producing a timing signal when each of the slits passes the photoelectric sensor during rotation of the rotary disk. The control means controls the operations of the plurality of light-emitting elements and the single light-emitting element, in response to the timing signal. In this case, the control means may be adapted to activate selectively the plurality of light-emitting elements to emit the beams of light when the image-reading portions of the corresponding reading units are positioned opposite to the respective reading spots on the recording medium. The control means holds the single light-sensitive element in its operative position.

Accoording to a still further preferred arrangement of the above embodiment, the at least one light-emitting element consists of a plurality of light-emitting elements which are positioned opposite to second ends of the corresponding light-emitting optical fibers which have the first ends opposite to the surface of the recording medium. The medium support comprises a paper holder which has a length along the second axis, sufficient to cover all of the image-reading portions of the reading head, and which has a surface having a predetermined reflectance of light. In this case, the control means comprises: a control circuit for selectively activating the ligt-emitting elements and controlling an amount of the light beams emitted by the light-emitting elements; first commanding means for storing plural sets of quantitative data representative of different input levels of each of the light-emitting elements, the first commanding means applying the sets of quantitative data one after another to the control circuit; judging means for detecting a variation in an output level of the at least one light-sensitive element, due to change in the input level of said each light-emitting element, and for determining whether the output level of the at least one light-sensitive element has reached a predetermined reference value; memory means for storing the quantitative data of said each light-emitting element which is applied to the control circuit when the output level of the corresponding light-sensitive element has reached the reference value; and second commanding means for applying the quantitative data stored in the memory means, to the control circuit to activate said each light-emitting element based on the stored quantitative data, upon reading of the reading spots. In this case, the paper holder may preferably be made of a metallic material.

In the above arrangement, the input levels of the light-emitting elements, and consequently amounts of light emitted therefrom may be automatically adjusted to permit the light-sensitive means to provide the same level of output for all of the image-reading portions when the image-reading portions read areas of the medium having the same reflectance of light. For accomplishing this adjustment, the optical reader is operated without a recording medium placed on a medium holder in the form of the paper holder. This medium holder has a medium supporting surface having a predetermined reflectance of light. Since the medium holder serves as a member to provide a reference value of reflectance of light for adjusting the input levels of the light-emitting elements, it is not necessary to use an additional member for the adjustment.

According to another advantageous embodiment of the invention, the reading head comprises a body of a substantially sectorial transverse cross sectional shape, having an arcuate surface corresponding to an arc of a circle, and two substantially flat surfaces which cooperate with the arcuate surface to define a sector of the circle in transverse cross section of the body. The body has a pair of radial protrusions which extend along opposite ends of the arcuate surface parallel to a center-line of the circle. Each of the radial protrusions has a plurality of grooves formed in a circumferential direction of the body. The first ends of the light-emitting and light-receiving optical fibers are accommodated and fixed in the grooves in one of the radial protrusions, and second ends of the optical fibers opposite to the first ends are accommodated and fixed in the grooves in the other of the radial protrusions. The reading head further comprises a covering member covering the light-emitting and light-receiving optical fibers and the arcuate surface of the body.

In the above embodiment, the reading head may be manufactured economically and easily assembled without damage to the optical fibers. Stated in more detail, the light-emitting and light-receiving fibers may be easily installed on the body of the reading head, in the following manner. The body having a substantially sectorial transverse cross sectional shape is first installed in a recess formed in a jig, so that the arcuate surface of the sectorial body cooperates with the circumferential surface of the jig to define a circumferential surface of a cylinder. To attach the optical fibers, an optical fiber is wound on this cylinder during its rotation, in such manner that the portions of the optical fiber are accommodated in the grooves formed in the radial protrusions. After the portions of the optical fiber in the grooves are fixed therein by suitable means, the coil of the optical fiber wound on the cylinder is cut between the circumferential ends of the sectorial body and the corresponding circumferential ends of the jig, along the two radial protrusions. Finally, the body is removed from the jig. Thus, the light-emitting and light-receiving optical fibers are attached to the arcuate surface of the body. In addition, the covering member protects the attached optical fibers against damage during assembly of the body with other parts of the reading head.

In one preferred arrangement of the above embodiment, each of the grooves has a guide portion which is open in a top surface of the radial protrusion. The guide portion is formed such that its width as measured along the radial protrusion decreases in a direction from the top surface toward a bottom of the groove.

In another preferred arrangement of the above embodiment, the at least one light-emitting element and the at least one light-sensitive element are fixed on a single printed wiring board which is positioned relative to the body of the reading head such that the at least one light-emitting element and the at least one light-sensitive element are located adjacent to the second ends of the light-emitting and light-receiving optical fibers which are fixed in the grooves in the one of the radial protrusions.

In the above arrangement, a shielding plate may be provided between the body of the reading head and the printed wiring board. The shielding plate has a plurality of apertures formed therethrough to accommodate the at least one light-emitting element and the at least one light-sensitive element.

According to the invention, there is also provided a reading head for an optical reader for photoelectrically reading images on a surface of a recording medium, comprising: (a) at least one light-emitting element; (b) at least one light-sensitive element; (c) a plurality of light-emitting optical fibers having first ends opposite to the surface of the recording medium, and second ends opposite to the at least one light-emitting element, for transmitting beams of light from the at least one light-emitting element to emit the beams of light toward the surface of the medium; (d) a plurality of light-receiving optical fibers having first ends located adjacent to the first ends of the respective light-emitting optical fibers, and second ends opposite to the at least one light-sensitive element, for transmitting the light beams reflected from the medium surface to the at least one light-sensitive element; (e) a body of a substantially sectorial transverse cross sectional shape which is obtained by cutting a cylindrical blank in two planes which include an axis of the blank, the body having an acuate surface corresponding to an arc of a circumference of the cylindrical blank, the body having a pair of radial protrusions which extend along opposite ends of the arcuate surface parallel to a centerline of the circle, each of the radial protrusions having a plurality of grooves formed in a circumferential direction of the body, the first ends of the light-emitting and light-receiving optical fibers being accommodated and fixed in the grooves in one of the radial protrusions, and second ends of the optical fibers opposite to the first ends being accommodated and fixed in the grooves in the other of the radial protrusions; and (f) a covering member covering the light-emitting and light-receiving optical fibers and the arcuate surface of the body.

BRIEF DESCRIPTION OF THE DRAWING

The above and other objects, features and advantages of the present invention will be better understood from reading the following detailed description of preferred embodiments of the invention, when considered in connection with the accompanying drawing, in which:

FIG. 14 is a fragmentary view in cross section taken along line M—M of FIG. 12;

FIG. 15 is a fragmentary view in cross section taken along line N—N of FIG. 12;

DETAILED DESCRIPTION OF THE PREFERRED EMBODIMENTS

Figure 1:
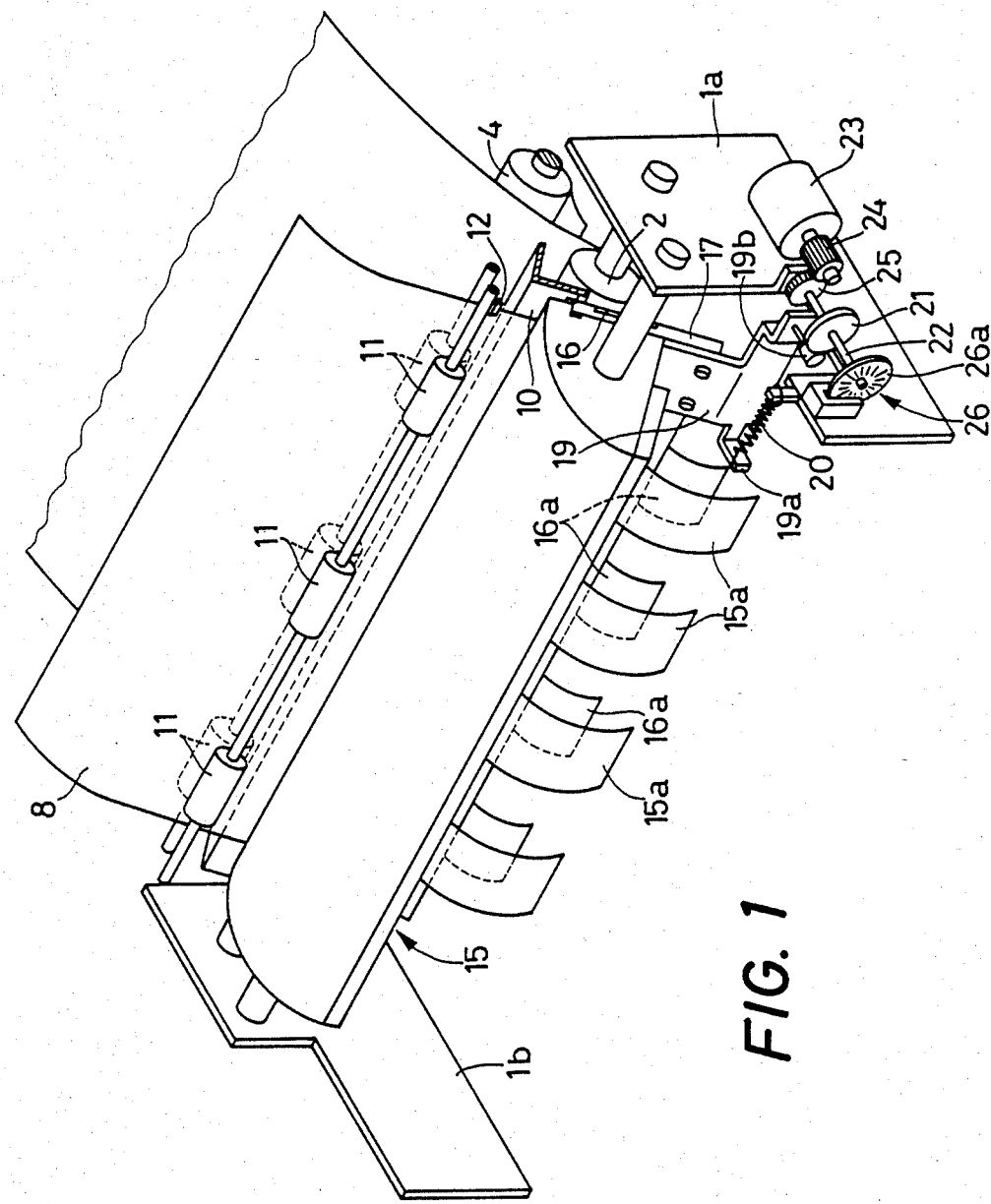
FIG. 1 is a perspective view of an input/output device incorporating one embodiment of an optical reader of the present invention.
Figure 2:
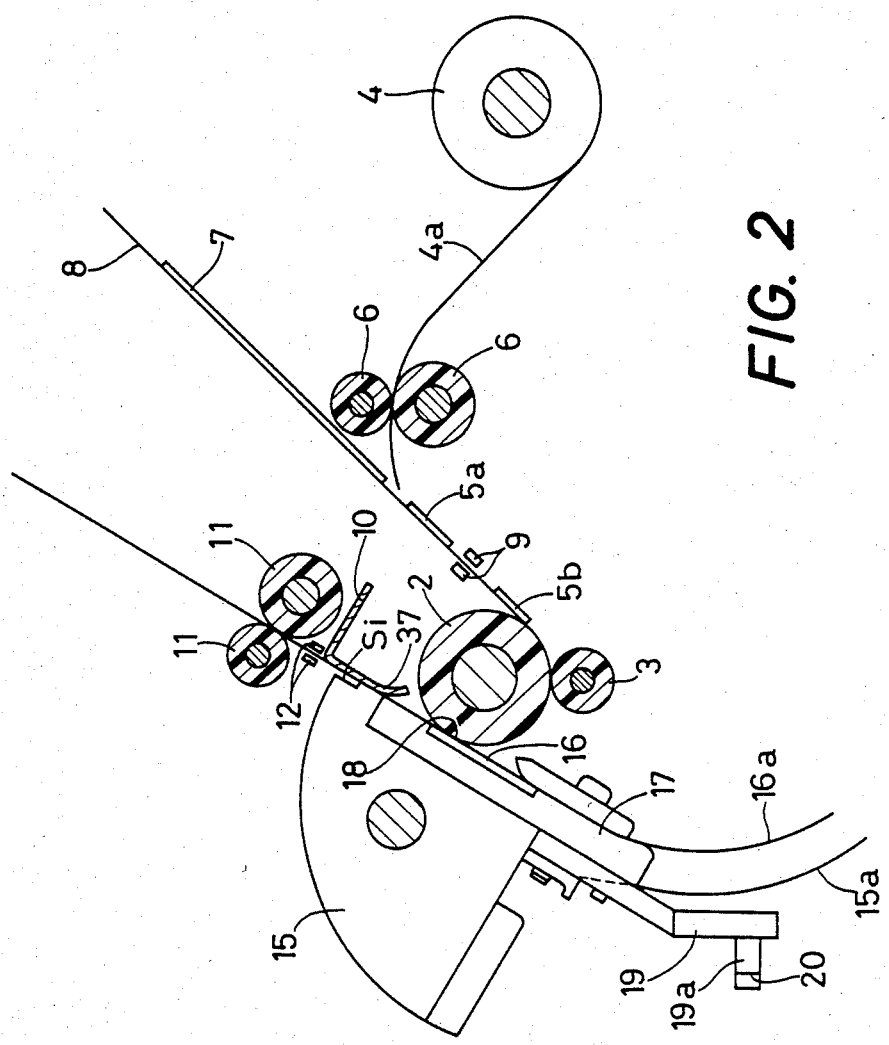
FIG. 2 is an elevational view in cross section of the input/output device of FIG. 1.

Referring first to FIGS. 1 and 2, there is shown an input/output device which incorporates one embodiment of an optical reader of this invention having an optical reading head, and which comprises a print head supported on the reading head.

The input/output device has a right and a left frame 1a, 1b, as shown in FIG. 1. These frames 1a, 1b rotatably support a platen 2 in the form of a roller. As shown in FIG. 2, a paper feed roller 3 is disposed beneath the platen 2. Behind the platen 2 is a paper roll 4 which serves as a paper supply to provide a continuous strip of heat-sensitive paper 4a on which printing is effected. The paper 4a is directed toward the nip between the platen 2 and the paper feed roller 3, while the paper 4a is guided along an inlet path which is defined by two guide plates 5a, 5b, and a pair of feed rollers 6, 6 disposed between the guide plate 5a and the roll 4. The paper 4a is fed from the roll 4 and its leading end is guided by the guide plates 5a, 5b so that the paper 4a is fed along a portion of the circumference of the platen 2 while being gripped by the platen 2 and the feed roller 3.

Another paper guide plate 7 is disposed over the pair of feed rollers 6, 6, to support and guide a sheet of paper 8 which carries images to be read by the instant optical reader. The sheet 8 is fed toward the nip of the platen 2 and the feed roller 3, while the sheet 8 is guided by the guide plate 7, and the above-indicated two guide plates 5a, 5b. To sense the paper 4a and the sheet 8, a photoelectric detector 9 is provided between the guide plates 5a and 5b. Above the platen 2, there is disposed a paper holder 10 which is made of a material suitable to give its surface a predetermined value of reflectance of light, for example, formed of a metal sheet such as a stainless steel sheet. This paper holder 10 functions to adjust an amount of light to be emitted from light-emitting elements (which will be described). Above the paper holder 10, three pairs of feed rollers 11 are provided to guide the paper 4a and the sheet 8. Another photoelectric detector 12 is disposed between the paper holder 10 and the guide rollers 11, to detect the paper 4a and the sheet 8. The feed roller 3, the feed rollers 6, and the feed rollers 11 are connected to and driven by independent roller drives 3a, 6a and 11a (FIG. 5), respectively. With the feed rollers 3, 6, 11 rotated by the respective drives 3a, 6a, 11a, the paper 4a and the sheet 8 are fed in the direction corresponding to the operating direction of each roller drive 3a, 6a, 11a.

The frames 1a and 1b support a reading head 15 for photoelectrically reading images on the sheet 8. The reading head 15 extends parallel to the platen 2, so as to cover the width of the sheet 8. To provide a suitable clearance between image-reading portions Dij (which will be described referring to FIG. 6) of the reading head 15 and the paper holder 10, the reading head 15 is provided with a tab 37 extending from its surface facing the paper holder 10.

Figure 3:
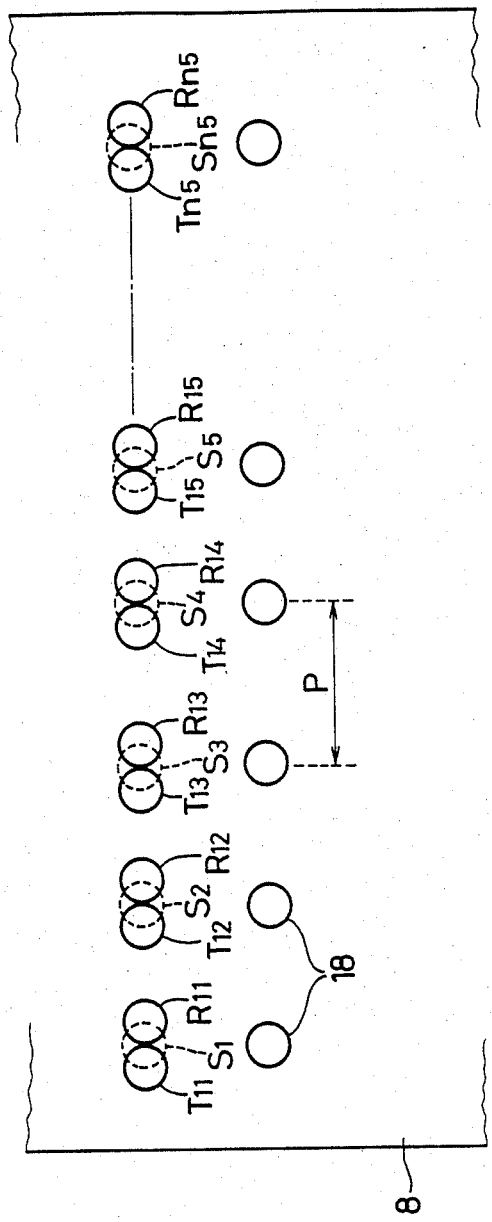
FIG. 3 is a schematic front elevational view of a reading head of the optical reader, and a thermal print head disposed on the reading head.
Figure 4:
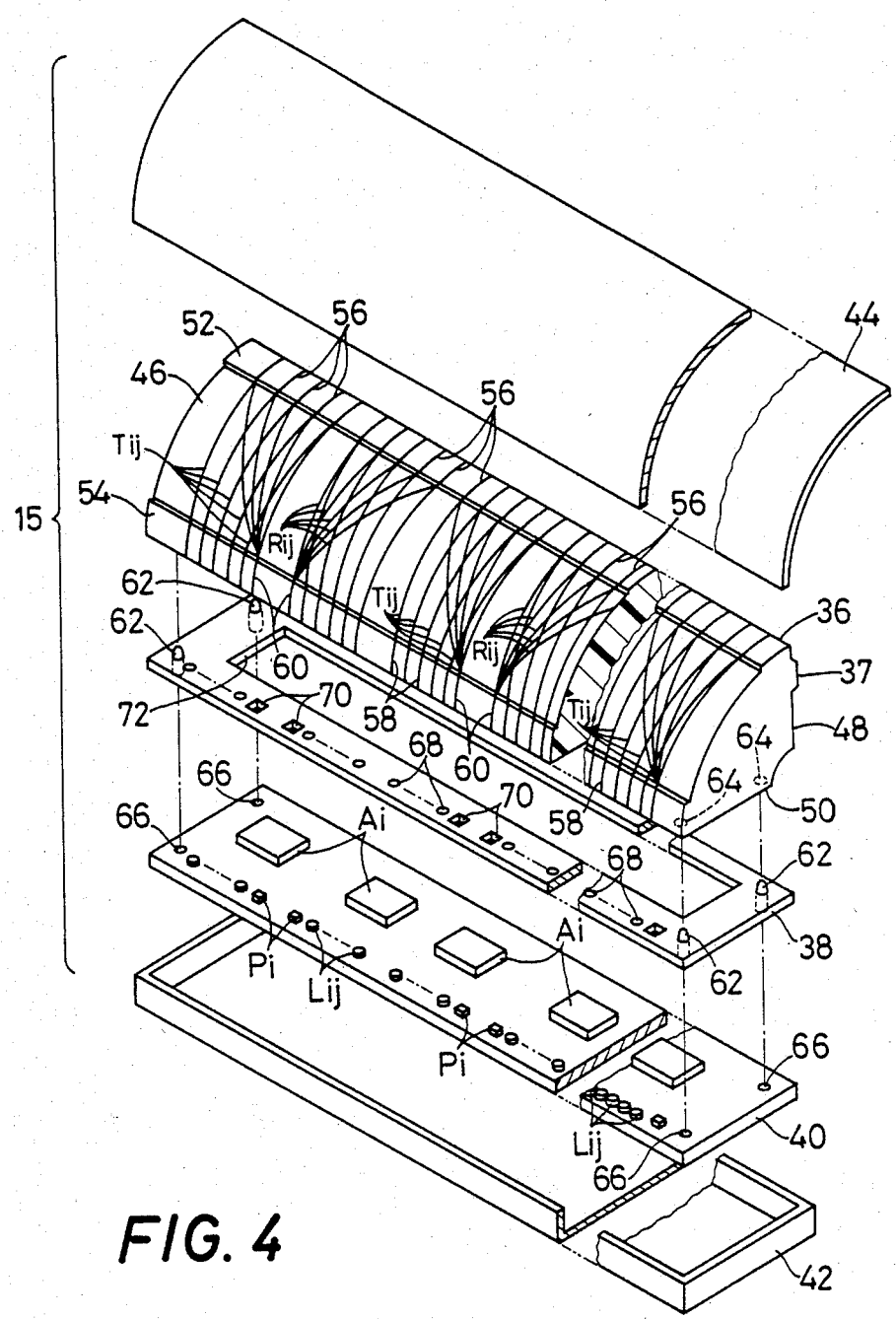
FIG. 4 is an exploded view in perspective of the reading head.

As described later in greater detail, the reading head 15 has many sets of light-emitting optical fibers Tij (i=1 to n, j=1 to 5) and corresponding sets of light-receiving optical fibers Rij (i=1 to n, j=1 to 5). Each set of the light-emitting and light-receiving optical fibers consists of five fibers as indicated in FIG. 4. These optical fibers Tij and Rij are fixed on the reading head 15, as described later in detail, such that their first ends are positioned opposite to the surface of the sheet 8, and such that the first ends of the light-emitting optical fibers Tij are located adjacent to the first ends of the corresponding light-receiving optical fibers Rij, as indicated in FIG. 3. The first end of each light-emitting optical fiber Tij and the first end of the corresponding light-emitting optical Rij cooperate to constitute the image-reading portion Dij (FIG. 6) indicated above. The image-reading portions Dij are spaced apart along the platen 2 at a predetermined pitch P which will be described in detail.

On the surface of the reading head 15 on the side of the platen 2, a thermal print head 16 is mounted with screws, such that a heat radiator plate 17 is sandwiched between the reading head 15 and the thermal print head. The thermal print head 16 has a plurality of heat-generating elements 18 which are spaced apart along the platen 2 at the same pitch as the image-reading portions Dij of the reading head 15, as indicated in FIG. 3. The heat-generating elements 18 are adapted to contact the heat-sensitive paper 4a supported by the platen 2, to effect thermal printing on the paper 4a.

Referring back to FIGS. 1 and 2, the reading head 15 has a bracket 19 attached to its lower right end portion. The bracket 19 has an arm 19a, and a cam follower 19b which is used to move the reading head 15 along the paper holder 10 (along the platen 2) in a reciprocating manner, as described later in detail. The reading head 15 is biased toward the right frame 1a by a spring 20 which is connected between the arm 19a of the bracket 19 and the right frame 1a.

The right frame 1a rotatably supports a shaft 22 to which a cam 21 is secured. With a biasing force of the spring 20, the cam 21 is held in pressed rolling contact with the cam follower 19b. The shaft 22 is rotated by a head reciprocating motor 23, through a first gear 25 mounted on the shaft 22 for simultaneous rotation therewith, and a second gear 24 which is mounted on an output shaft of the motor 23 and which meshes with the first gear 25. A rotary movement of the shaft 22 is detected by an encoder 26 which comprises a rotary disk 26a mounted on the shaft 22, and a light-emitting element and a light-sensitive element which constitute a photoelectric sensor. This photoelectric sensor, which is well known in the art, is disposed in the proximity of the rotary disk 26a. The rotary disk 26a has a plurality of slits which are formed in spaced-apart relation with each other in the circumferential direction of the disk. The photoelectric sensor of the encoder 26 produces a timing signal when each of the slits in the rotary disk 26a passes the photoelectric sensor during rotation of the rotary disk 26a, i.e., of the cam 21. The timing signal is applied to a central processing unit 30 (hereinafter referred to as "CPU 30") of a microcomputer 29 which will be described referring to FIG. 5. With the head reciprocating motor 23 driven under the control of the CPU 30 via a motor driver circuit 27, the second gear 24 on the output shaft of the motor 23 is rotated, whereby the first gear 25 meshing with the second gear 24 is rotated to rotate the shaft 22. Thus, the cam 21 and the rotary disk 26a are rotated. A rotary motion of the cam 21 engaging the cam follower 19b will cause the cam follower 19b to be pushed toward the left frame 1b. As a result, the reading head 15 is moved against a biasing force of the spring 20, in the same direction from the right frame 1a toward the left frame 1b. After the cam 21 has been rotated through a given angle, the leftward movement of the reading head 15 is stopped. Subsequently, the cam 21 allows the reading head 15 to be moved in the reverse direction, that is, to the right toward the right frame 1a, by the biasing force of the spring 20. During rotation of the cam 21, the encoder 26 detects an angular displacement of the rotary disk 26a and consequently of the cam 21, thereby detecting the position of the reading head 15. Namely, the encoder 26 applies to the CPU 30 timing signals upon which the reading head 15 effects a reading operation. The reading head 15 and the thermal print head 16 are connected to the microcomputer 29 through flexible cables 15a and 16a, respectively, which extend from the lower parts of the heads 15, 16, as shown in FIGS. 1 and 2.

Figure 5A:
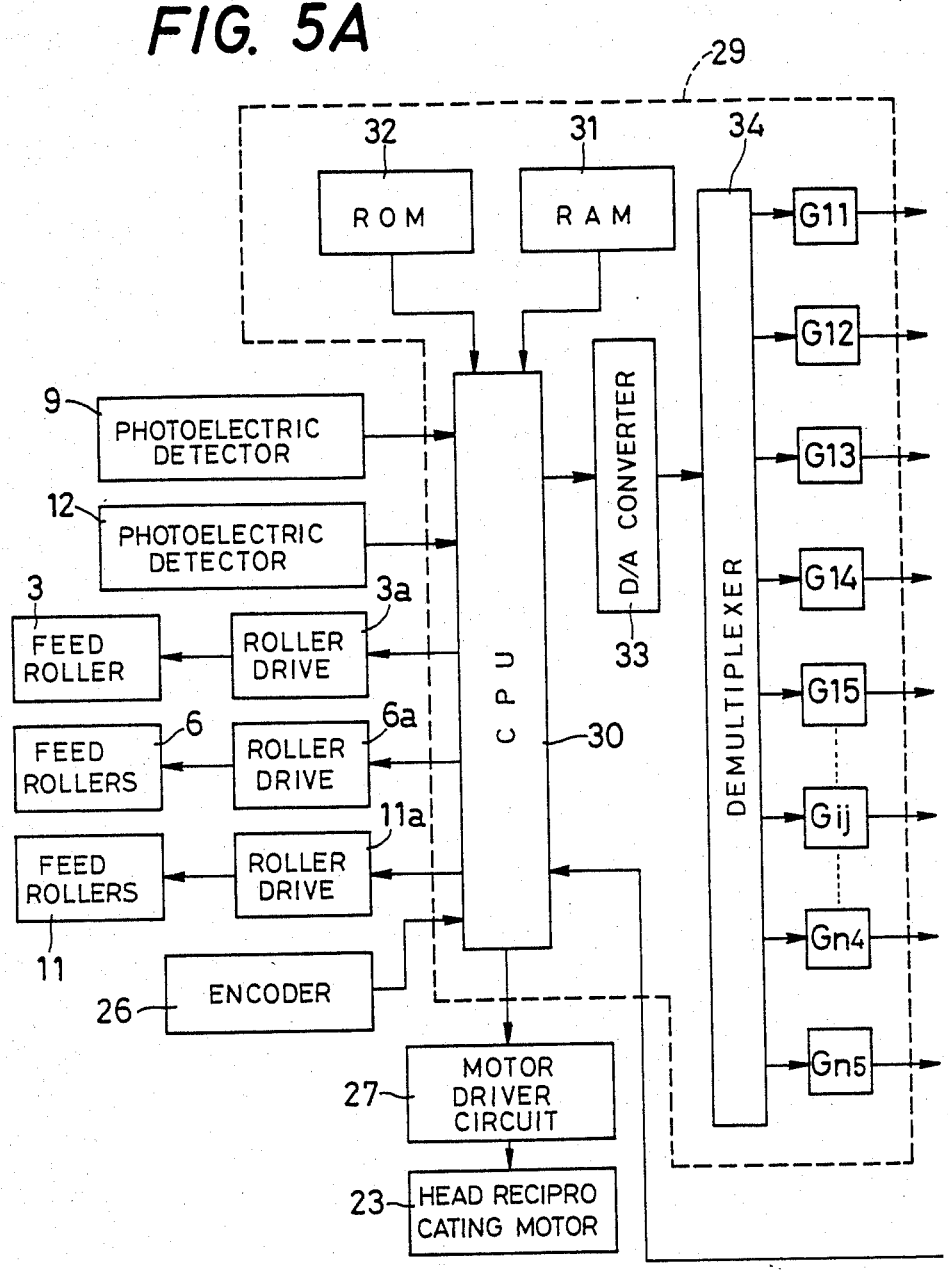
FIGS. 5A and 5B are connected schematic block diagram showing a control system for the optical reader.
Figure 5B:
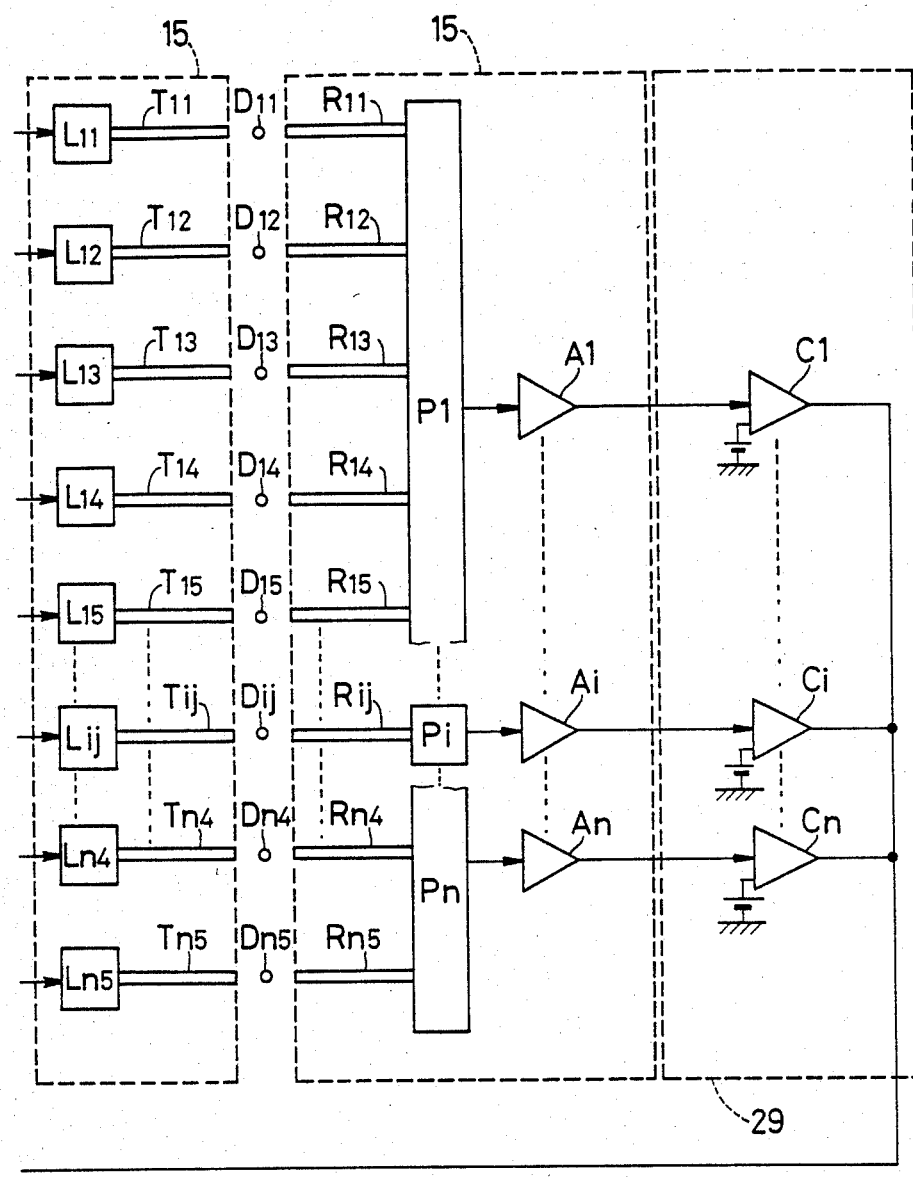

Referring next to FIGS. 4 and 5, the construction of the reading head 15 will be described in detail.

The reading head 15 comprises: a body 36 which provides a support for the previously indicated light-emitting optical fibers Tij and light-receiving optical fibers Rij; a shielding plate 38 disposed below the body 36; a printed wiring board 40 disposed below the shielding plate 38; a bottom casing 42 accommodating the bottom portion of the body 36, the shielding plate 38 and the printed wiring board 40; and a covering member 44 which covers the assembly of the reading head 15.

The body 36 is made of a synthetic resin such as polycabonate, containing glass fibers. The body 36 has a generally sectorial shape, more precisely, a substantially quadrant shape in transverse cross section. The body 36 has a substantially arcuate surface 46, and two substantially flat surfaces 48, 50 which intersect each other at right angles and cooperate with the arcuate surface 46 to define a sector, more precisely, a quadrant in cross section. The arcuate surface 46 has a first and a second integrally formed radial protrusion 52, 54 at its circumferentially opposite ends, which protrusions 52, 54 extend parallel to the platen 2, i.e., parallel to the axis of the body 36. The first radial protrusion 52 has many sets of grooves 56 formed in the circumferential direction of the arcuate surface 46, that is, perpendicularly to the axis of the body 36. Each set of grooves 56 consists of grooves corresponding to each set of the optical fibers Tij, Rij. These grooves 56 are spaced from each other along the first radial protrusion 52, at a pitch equal to the pitch of the image-reading portions Dij of the reading head 15. As described later, the first ends of each pair of light-emitting and light-receiving optical fibers Tij and Rij which constitute each image-reading portion Dij are accommodated and fixed in the corresponding one of the grooves 52, so that the image-reading portion Si is positioned opposite to the surface of the sheet 8.

In the meantime, the second radial protrusion 52 has many sets of grooves 58 each set consisting of five grooves 58, and further has many grooves 60. These grooves 58 and 60 are formed perpendicularly to the length of the second radial protrusion 52, and are spaced from each other at a suitable pitch. As described later in detail, the second end of each light-emitting optical fiber Tij is accommodated and fixed in the corresponding groove 58, while the second ends of each set of the five light-receiving optical fibers Rij are all accommodated and fixed in the corresponding groove 60.

Thus, as shown in FIG. 4, the five light-emitting optical fibers Tij of each set extend on the arcuate surface 46 parallel to each other, between the first and second radial protrusions 52 and 54 to which the first and second ends of the fibers Tij are fixed as indicated above. On the other hand, the five light-receiving optical fibers Rij, whose first ends are fixed together with the first ends of the corresponding light-emitting optical fibers Tij, extend on the arcuate surface 46 toward the corresponding one of the grooves 60 which is located on one side of the corresponding set of the five grooves 58.

The shielding plate 38 has a plurality of pins 62 protruding from its opposite surfaces toward the body 36 and the printed wiring board 40. The body 36 has pin holes 64 in its bottom surface, and the printed wiring board 40 has pin holes 66 in its upper surface. The body 36, shielding plate 38 and printed wiring board 40 are fixed to each other with the pins 62 engaging the pin holes 64 and 66. At the front end of the upper surface of the printed wiring board 40, there are mounted many light-sensitive elements Pi ($i=1$ to 5) in the form of photo-transistors. The light-sensitive elements Pi are disposed in spaced-apart relation in the direction of length of the printed wiring board 40, such that the elements Pi are aligned with the corresponding grooves 60 in which are positioned the second ends of the light-receiving optical fibers Rij. Further, many sets of light-emitting elements Lij in the form of light emitting diodes are disposed on the upper surface of the printed wiring board 40, such that the elements Lij are aligned with the second ends of the corresponding light-emitting optical fibers Tij which are positioned in the grooves 58.

The shielding plate 38 has many sets of first apertures 68 aligned with the light-emitting elements Lij, and many second apertures 70 aligned with the light-sensitive elements Pi. These first and second apertures 68 and 70 are formed through the thickness of the shielding plate 38, to accommodate the light-emitting elements Lij and the light-sensitive elements Pi respectively. Beams of light emitted from the light-emitting elements Lij are transmitted through the first apertures 68 and through the light-emitting optical fibers Tij, and the transmitted light beams are emitted from the first ends of the fibers Tij toward the surface of the sheet 8 to irradiate corresponding illumination spots Ta (FIG. 7) on the sheet 8. The light beams reflected by corresponding reflection spots Ra (FIG. 7) on the sheet 8 are received by the light-receiving optical fibers Rij and transmitted therethrough to the corresponding light-sensitive elements Pi through the second apertures 70. Each of the light-sensitive elements Pi produces an electric signal representative of a reflectance of light in an overlapping spot (Si) in which the illumination and reflection spots Ta and Ra of the same image-reading portion Dij overlap each other. That is, the electric signal represents an amount of light received by the light-sensitive element Pi. The light-emitting elements Lij and the light-sensitive elements Pi are accommodated within the first and second apertures 68 and 70, respectively, in such manner as to prevent leakage of the light beams from the elements Lij, and to prevent the light-sensitive elements Pi from receiving light beams other than the beams from the light-receiving optical fibers Rij.

The shilding plate 38 further has a central elongate rectangular opening 72 which accommodates many amplifiers Ai mounted on the upper surface of the printed wiring board 40. The amplifiers Ai amplify the electric signals generated from the light-sensitive elements Pi.

As previously indicated, the bottom portion of the body 46, and the shileding plate 38 and the wiring board 40 are housed in the bottom casing 42. In the meantime, the covering member 44 is bonded to the arcuate surface 46 of the body 36, so as to cover the optical fiber Tij and Rij.

Figure 6:
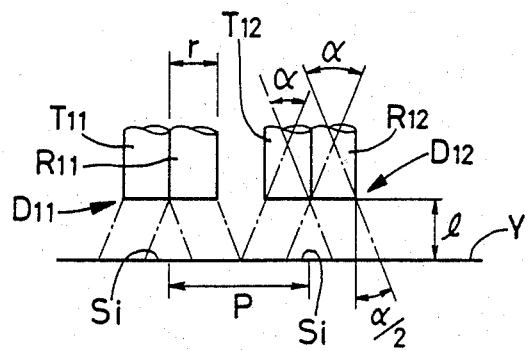
FIG. 6 is an illustration showing image-reading portions of the reading head, indicating a pitch between the adjacent image-reading portions.
Figure 7:
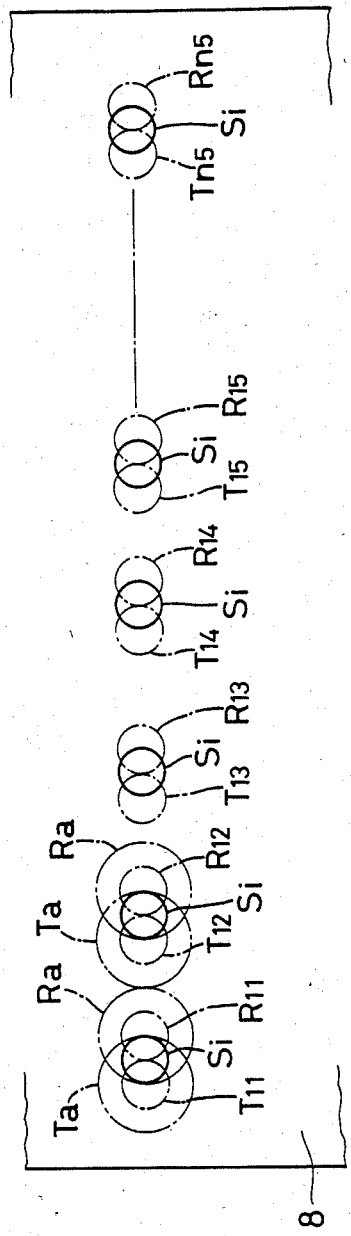
FIG. 7 is a view showing reading spots in relation to illumination and reflection spots of the image-reading portions.

Referring next to FIGS. 6 and 7, the arrangement of the image-reading portions Dij will be described. As previously indicated, the first ends of each pair of the corresponding light-emitting and light-receiving optical fibers Tij and Rij form each image-reading portion Dij. Apparently, each pair of the optical fibers Tij and Rij constitutes a reading unit having the image-reading portion Dij. In this connection, it is noted that "i" following characters T, R, L and D indicates the numbers "n" of the individual sets or groups of the optical fibers Tnj, Rnj, light-emitting elements Lnj or image-reading portions Dnj, while "j" following "i" indicates the numbers "n" of the individual optical fibers Tin, Rin, elements Lin or image-reading portions Din of each set or group.

Each of the optical fibers Tij, Rij is made of acrylic resin, and a diameter r (1/N) of 0.125 mm. The first end of each optical fiber Tij, Rij has an angle $\alpha$ of radiation or incidence of light of 60 degrees. In this case, the light beam emitted from the first end of the optical fiber Tij irradiates the circular illumination spot Ta indicated in broken line in FIG. 7. In the meantime, the first end of the corresponding light-receiving optical fiber Rij receives the light beam which is reflected from the circular reflection spot Ra indicated in broken line in the same figure. The illumination and reflection spots Ta and Ra overlap each other in an overlapping spot (Si) which corresponds to a reading spot Si on the sheet 8, which is read by the image-reading portion Dij. A distance l between the surface of the sheet 8 and the tip of the image-reading portion Dij may be selected within a range of 0.1–0.5 mm. In the illustrated optical reader, the distance l is set at 0.1 mm.

In order that reading spots Si on the sheet 8 are read by the image-reading portions Dij while the reading head 15 is moved at a constant speed along the platen 2, the image-reading portions Dij should be spaced from each other at a pitch p (spacing between the adjacent portions Dij) which satisfies the following formula (1):

$$p = a/N - 1/xN \quad (1)$$

where, a: number of the overlapping spots (Si) which is formed by each image-reading portion Dij while the reading head 15 is moved its predetermined stroke along the platen 2 (along the second axis)

1/N: size of the overlapping or reading spot Si as measured along the second axis (N=number of the overlapping spots (Si) per unit distance x: number of the light-receiving optical fibers Rij connected to each light-sensitive element Pi By substituting the above-indicated values for a, N and x in the above formula (1), the pitch p is obtained as:

$$p = 4 \times 0.125 - 0.125 \times 1/5 = 0.475 \text{ (mm)}$$

In the present embodiment, therefore, the pitch p at which the image-reading portions Dij are spaced along the platen 2 (along the second axis) is set at 0.475 mm.

On the other hand, the pitch p should be greater than a value q obtained from the formula (2) indicated below, in order to prevent the illumination spot Ta of a given image-reading portion Din from overlapping the reflection spot Ra of the adjacent image-reading portion Di(n+1) or Di(n−1), for example, to prevent the light-receiving optical fiber R11 of the image-reading portion D11 from receiving a light beam which is emitted from the light-emitting optical fiber T12 of the adjacent image-reading portion D12.

$$q = 2r + 2l \cdot \tan(\alpha/2) \quad (2)$$

By substituting the actual values for r, l and $\alpha$ in the formula (2), the value q is obtained as:

$$q = 2 \times 0.125 + 2 \times 0.1 \times \tan 30° = 0.364 \text{ (mm)}$$

Since the pitch p of the image-reading portions Dij of the illustrated embodiment is 0.475 mm which is greater than the value q calculated according to the above formula (2), the light beam emitted from any optical fiber Tin will not be received by the optical fiber Ri(n+1) or Ri(n−1).

Referring back to FIG. 5, the electric signal produced from each light-sensitive element Pi is received by the corresponding amplifier Ai, and an output of the amplifier Ai is applied to an input of a corresponding comparator Ci (i: 1 to 5) incorporated in the microcomputer 29. The comparators Ci serve as judging means for determining whether the brightness or light reflectance of a reading spot on the sheet 8 is above or below a predetermined reference level. To effect this determination, a reference signal is applied to another input of each comparator Ci. An output of each comparator Ci is fed to the CPU 30 within the microcomputer 29. When the output signal from the amplifier Ai is higher than a reference value of the reference signal, the comparator Ci produces a high-level signal. Similarly, the comparator Ci produces a low-level signal when the received signal from the amplifier is lower than the reference value.

The CPU 30 is connected to a random-access memory 31 (hereinafter referred to as "RAM 31) and a read-only memory 32 (hereinafter referred to as "ROM 32"). To the CPU 30, there are connected: a diginal/analog converter 33 (D/A converter 33) within the microcomputer 29; the head reciprocating motor 23 via the motor driver circuit 27; the photoelectric detectors 9, 12; and the roller drives 3a, 6a, 11a. The RAM 31 is adapted to store the output signals of the comparators Ci, effective quantitative data for controlling amounts of light to be emitted by the light-emitting elements Lij, and other information.

The ROM 32 stores a program (to execute a routine shown in FIG. 9) for controlling the amounts of light to be emitted by the light-emitting elements Lij, calibration quantitative data G (indicated in FIG. 8) representative of different levels of an input to the light-emitting elements Lij, a program for controlling the motor driver circuit 27, a program for controlling a demultiplexer 34 (which will be described), and other data.

The CPU 30 controls the operation of the optical reader according to the programs and data stored in the RAM 31 and the ROM 32. Th CPU 30 applies to the D/A converter 33 the calibration quantitative data G to adjust the input level of the individual light-emitting elements Lij. Thus, the CPU 30 serves as means for adjusting the amount of light to be emitted by each ligth-emitting element Lij, that is, as means for adjusting the output level of the light-emitting elements Lij. In response to the calibration quantitative data G from the CPU 30, the D/A converter 33 converts a diginal signal of the received quantitative data G into a proportional analog signal, and applies the analog signal to the demultiplexer 34 within the microcomputer 29.

Under the control of the CPU 30, the demultiplexer 34 applies the output of the D/A converter 33 to the selected one of the control circuits Gij which corresponds to the light-emitting element Lij whose output is to be adjusted or calibrated. These control circuits Gij are also provided in the microcomputer 29. Each control circuit Gij controls the corresponding light-emitting element Lij to enable the same to emit an amount of light corresponding to the output signal of the D/A converter 33.

Before the reading head 15 starts reading images on the sheet 8, the amounts of light to be emitted by the light-emitting elements Lij are adjusted according to the control program and the calibration quantitative data stored in the ROM 32. Initially, the CPU 30 checks according to the signals from the photoelectric detectors 9, 12, to see if the sheet 8 is not present on the paper holder 10. That is, if the signals of both detectors 9, 12 indicate absence of the sheet 8, the CPU 30 judges that the sheet 8 is not present on the paper holder 10, and then proceeds with executing steps S1–S7 of a control routine of FIG. 9 the program of which is stored in the ROM 32.

Figure 8:
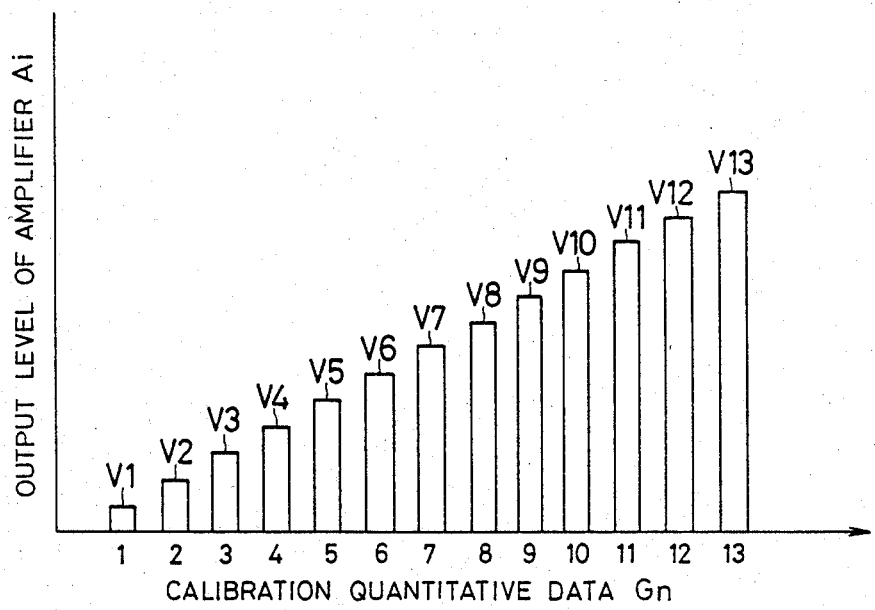
FIG. 8 is a graph showing a relation between calibration data Gn and an output level of an amplifier of the reading head.
Figure 9:
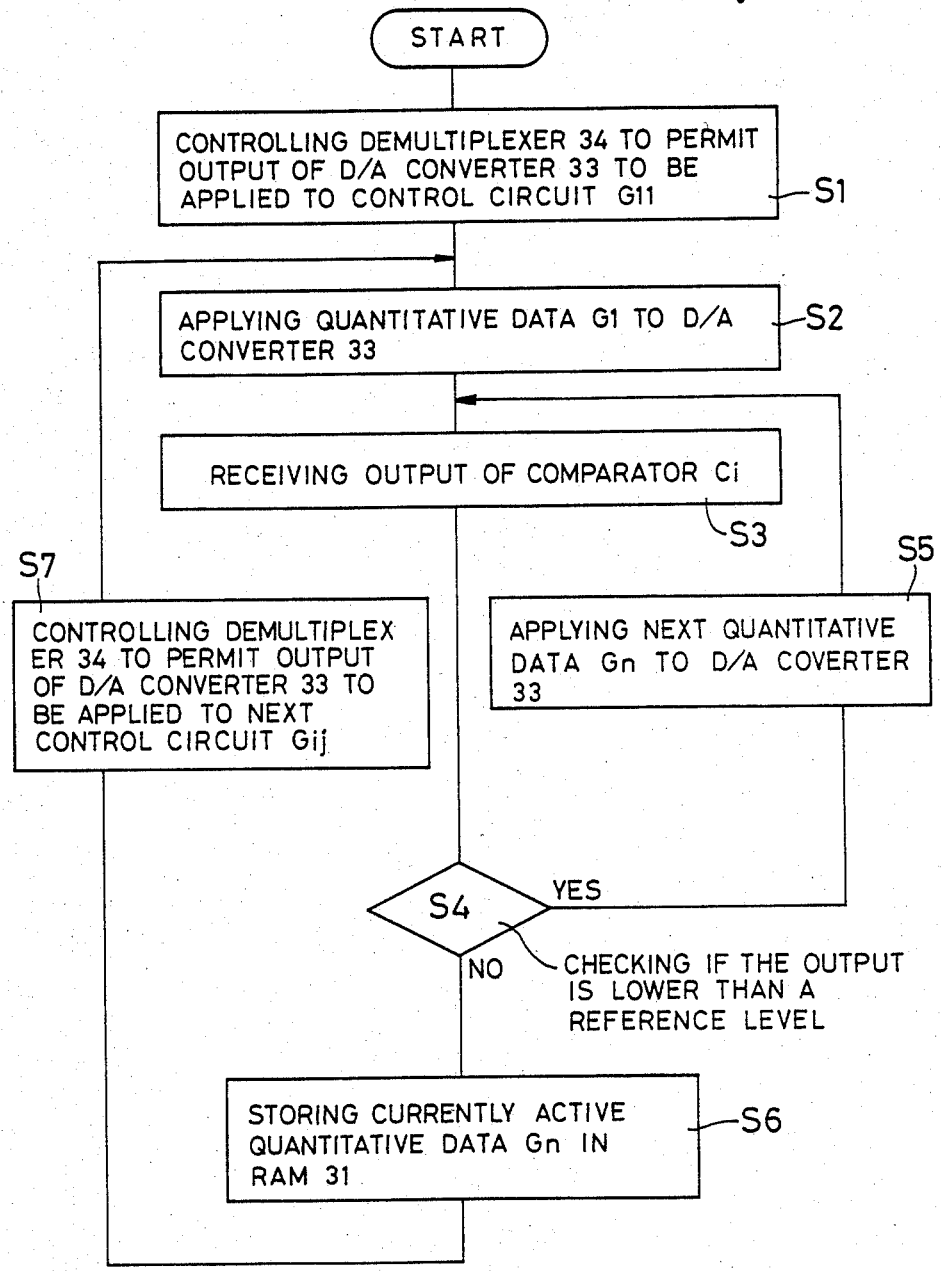
FIG. 9 is a flow chart showing a routine for adjusting an amount of light to be emitted by a light-emitting element.

Described more specifically, the CPU 30 executes step S1 in which the CPU 30 controls the demultiplexer 34 so as to permit the output signal of the D/A converter 33 to be applied to the first control circuit G11. Then, the CPU 30 goes to step S2 to apply first calibration quantitative data G1 to the D/A converter 33. The D/A converter 33 converts the received quantitative data G1 into a corresponding analog signal, which is applied to the control circuit G11 via the demultiplexer 34. As a result, the corresponding light-emitting element L11 emits an amount of light corresponding to its input level determined by the quantitative data G1. The light beam from the element L11 is transmitted through the corresponding light-emitting optical fiber T11 to the surface of the paper holder 10. As previously described, the paper holder 10 has a predetermined reflectance of light. The light beam reflected by the paper holder 10 is received by the corresponding light-receiving optical fiber R11, and transmitted to the corresponding light-sensitive element Pi. Consequently, the light-sensitive element Pi generates an output signal, which is then amplified by the corresponding amplifier A1. The output of the amplifier A1 is V1 as indicated in FIG. 8. The output V1 of the amplifier A1 is applied to the corresponding comparator C1, and compared with the reference signal. Then, in step S3, the comparator C1 applies to the CPU 30 a high-level or low-level output signal, depending upon the level of the output signal V1 from the amplifier A1. Step S3 is followed by step S4 in which the CPU 30 checks, based on the level of the output signal V1 of the comparator C1, to see if the output level of the comparator C1 is low or high, i.e., if the output V1 of the amplifier A1 is lower than the reference value or not. If the checking in step S4 is affirmative (YES), the CPU 30 executes step S5 to apply next calibration quantitative data G2 to the D/A converter 33. Step S5 is followed by step S3 and step S4. In this instance, the output of the amplifier A1 is V2, and the corresponding output of the comparator C1 is applied to the CPU 30 (S3). If the CPU 30 judges that the output V2 of the amplifier A1 is still lower than the reference value (S4), the CPU 30 again updates the calibration data Gn, namely, applies the next data G3 to the D/A converter 33 (S5). In the same way, the calibration quantitative data Gn to be applied to the D/A converter 33 is increased until the output level of the comparator C1 becomes high. If the checking in step S4 reveals that the output of the comparator C1 (amplifier A1) is higher than the reference value, the CPU 30 goes to step S6 in which the CPU 30 judges that the calibration quantitative data Gn which is currently applied to the D/A converter 33 is suitable for the light-emitting element L11, and stores that data Gn in the RAM 31, as effective quantitative data Gn.

Step S6 is followed by step S7 in which the CPU 30 controls the demultiplexer 34 to permit the output of the D/A converter 33 to be applied to the next control circuit G12 for the next light-emitting element L12. In the same way as described in connection with the light-emitting element 11, the CPU 30 stores in the RAM 31 the calibration quantitative data Gn which is applied to the D/A converter 33 when the comparator C1 produces a high-level output signal.

The CPU 30 repeats the same steps S2–S7 to store in the RAM 31 sets of effective quantitative data Gn which are suitable for all of the light-emitting elements Lij.

Figure 10:
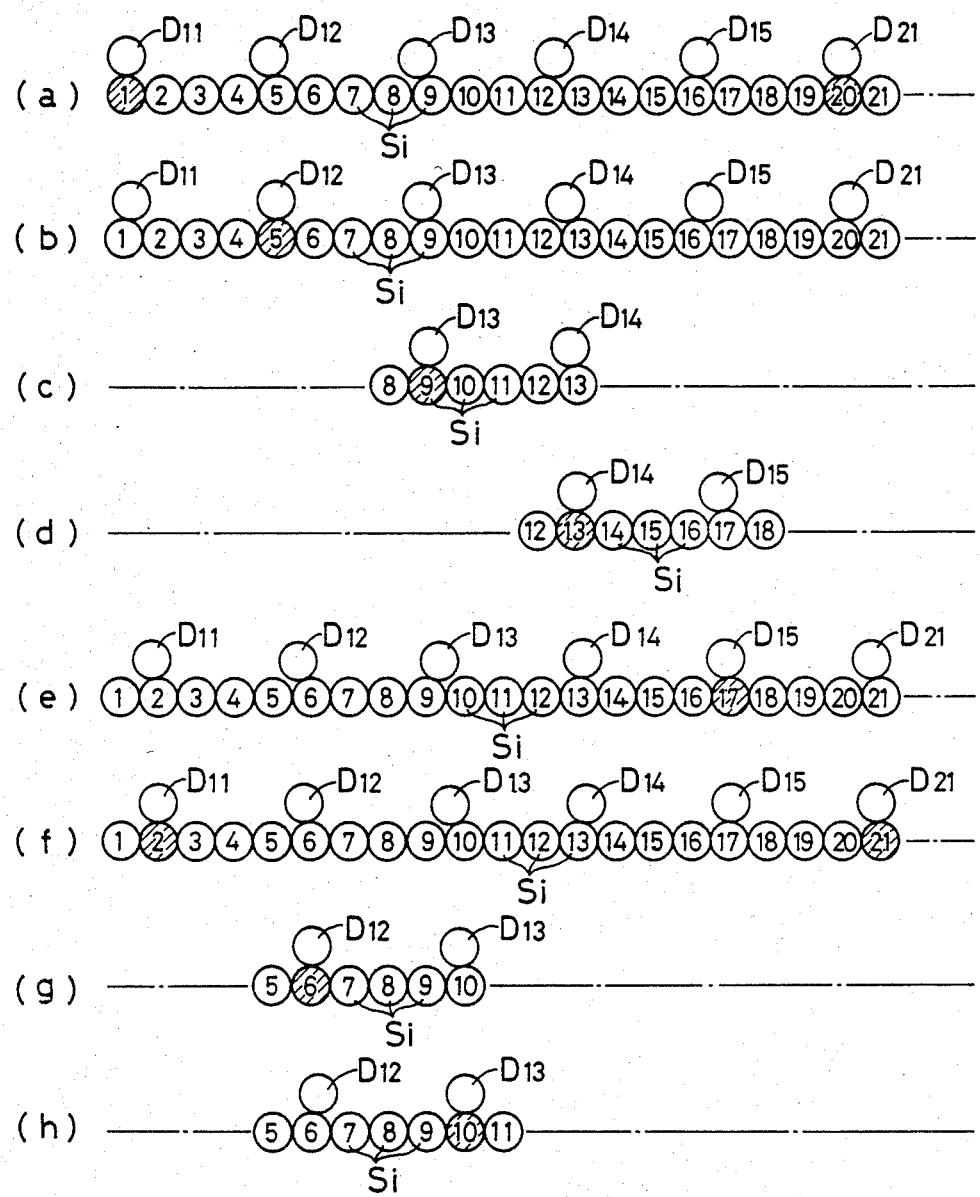
FIG. 10 is an illustration indicating an image reading operation of the reading head.

The operation of the reading head 15 of the optical reader constructed as described hitherto will be described referring to FIGS. 1, 5 and 10, in particular to FIG. 10. In FIG. 10, the image-reading portions Dij are indicated by circles which are equal in size to numbered circles which indicate the reading spots Si on the sheet 8.

Initially, the CPU 30 activates the motor driver circuit 27 to apply a suitable drive signal to the head reciprocating motor 23, whereby the motor 23 is operated in a predetermined direction. As a result, the cam 21 is rotated in the corresponding direction, via the first and second gears 25, 24. With the cam 21 thus rotated, the reading head 15 is moved along the paper holder 10, by means of pressed rolling contact of the cam follower 19b with the periphery of the cam 21. In the meantime, a first timing signal is produced by the encoder 26, and is applied to the CPU 30. In response to this timing signal, the individual image-reading portions Dij are positioned relative to the reading spots Si, as indicated at (a) in FIG. 10. That is, the image-reading portions Di1 are concurrently alinged with the respective reading spots Si which are indicated by the hatched circles. (In this example, "i" in Si is equal to 19 m+1, where m=0, 1, 2, ...) At (a) in FIG. 10, only the image-reading portions D11 and D21 are indicated as being aligned with the corresponding reading spots Si. In this condition, the CPU 30 applies to the D/A converter 33 the predetermined effective quantitative data. This data is applied to the corresponding control circuit Gi1 through the demultiplexer 34. Consequently, the light-emitting elements Li1 corresponding to the image-reading portions Di1 are activated simultaneously.

Consequently, beams of light from the light-emitting elements Li1 are transmitted through the corresponding light-emitting optical fibers Ti1, and emitted from the first ends of the optical fibers Tn1 to irradiate the corresponding reading spots Si. The light beams reflected from the reading spots Si are received by the corresponding light-receiving elements Ri1, and transmitted therethrough to the corresponding light-sensitive elements Pi. The light-sensitive elements Pi apply to the amplifiers Ai electric signals corresponding to the received amounts of light. The electric signals are amplified by the amplifiers Ai, and applied to the comparators Ci, for comparison with a threshold value Vth. If the level of the signal is higher than the threshold level Vth, each comparator Ci applies a high-level signal to the CPU 30. If the signal level is lower than the level Vth, a low-level signal is applied to the CPU 30 from the comparator Ci. In this manner, the CPU 30 receives high- or low-level signals from the comparators Ci, which indicate the results of reading of images in the reading spots Si. This set of reading data of the image-reading portions Dn1 is stored in the RAM 31.

Then, a second timing signal is generated from the encoder 26, and the reading head 15 is positioned for alignment of the image-reading portions Di2 with the corresponding reading spots Si ($i=19m+5$, where $m=0, 1, 2, \ldots$) indicated at (b) in FIG. 10 in which only one reading spot Si ($i=5$) is indicated by the hatched circle. In this condition, the CPU 30 activates concurrently the light-emitting elements Li2 corresponding to the image-reading portions Di2.

In the same manner as previously described, the CPU 30 stores in the RAM 31 a set of reading data obtained by activation of the light-emitting elements Li2, which reading data are determined depending upon the amounts of light received by the light-sensitive elements Pi. That is, the reading data represent the output levels of the comparators Ci when the light-emitting elements Li2 are activated.

Thus, as shown in FIG. 10 and as indicated in the following table, the different groups of the image-reading portions Dij are alinged with the appropriate reading spots Si and activated to read the reading spots Si, in timed relation with the timing signals which are generated while the reading head 15 is moved in the same direction.

| Image-Reading Portions Dij | Reading spots Si | Refer to FIG. 10 |
| --- | --- | --- |
| Di1 | $i = 19m + 1$ | at (a) |
| Di2 | $i = 19m + 5$ | at (b) |
| Di3 | $i = 19m + 9$ | at (c) |
| Di4 | $i = 19m + 13$ | at (d) |
| Di5 | $i = 19m + 17$ | at (e) |
| Di1 | $i = 19m + 2$ | at (f) |
| Di2 | $i = 19m + 6$ | at (g) |
| Di3 | $i = 19m + 10$ | at (h) |
| . | . | . |
| . | . | . |
| . | . | . | m = 0 to n (integer)

The above-described reading operations are effected while the reading head 15 is moved from left to right (in FIG. 10) with the cam 21 rotated a half turn. During this half turn of the cam 21, an entire line of images on the sheet 8 is read by the reading head 15. During the next half turn of the cam 21, the sheet 8 is fed by a distance equal to a line spacing, by the paper feed rollers 3, 11, while the reading head 15 is returned to its original start position. Then, the next reading cycle for the next line is carried out in the same way as described above.

In the present embodiment, the pitch of the heat-generating elements 18 of the thermal print head 18 is equal to the pitch p of the image-reading portions Dij of the reading head 15. Therefore, the printing by the thermal print head 18 may be effected in the same manner as the image reading by the reading head 15.

Referring next to FIGS. 11-15, there will be described in detail a method of fixing the light-emitting and light-receiving optical fibers Tij and Rij on the body 36 of the reading head 15, and the arrangement of the body 36 for accommodating and fixing the first and second ends of the optical fibers Tij and Rij.

Figure 11:
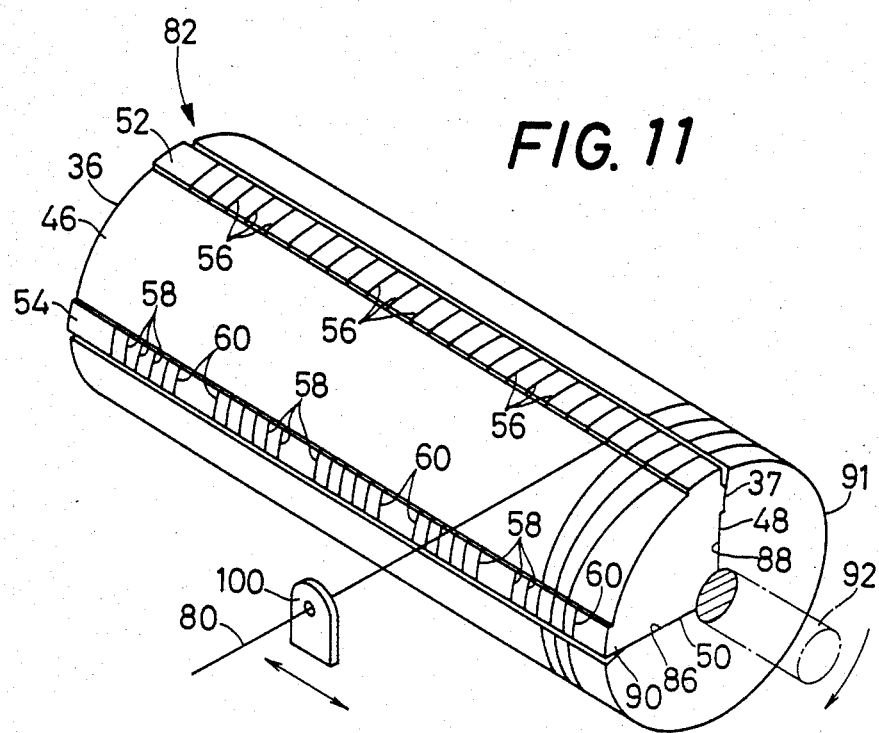
FIG. 11 is a perspective view showing a method of fixing optical fibers on a body of the reading head.
Figure 12:
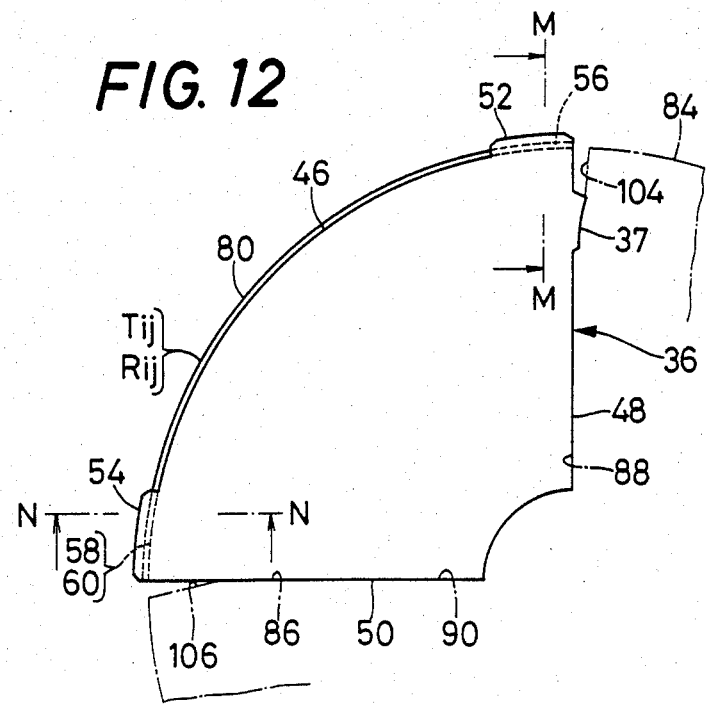
FIG. 12 is a right end view of a body of the reading head.

The optical fibers Tij and Rij are installed by winding an optical fiber 80 on a cylinder 82 which consists of the body 36 and a jig 84, as shown in FIG. 11. The jig 84 has a longitudinal cutout 86 which is defined by two flat surfaces 88, 90 perpendicular to each other. The longituddinal cutout 86 removably accommodates the body 46 such that the surfaces 88, 90 contact the surfaces 48, 50 of the body 46, as shown in FIGS. 11 and 12, and such that a circumferential surface 91 of the jig 84 cooperates with the arcuate surface 46 of the body 46 to form the circumferential surface of the cylinder 82. The cylinder 82 is supported so that it is rotatable in one direction about a drive shaft 92.

Figure 13:
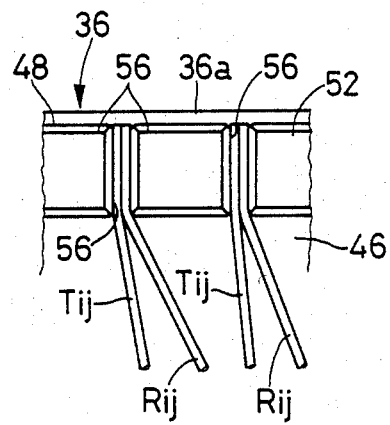
FIG. 13 is a fragmentary plan view, showing first ends of the optical fibers fixed on the head body.

As indicated in FIGS. 13 and 14, the previously described grooves 56 formed in the first protrusion 52 have a width sufficient to accommodate the first ends of the pair of corresponding fibers Tij, Rij, side by side, i.e., each groove 56 has a width substantially equal to a diameter of the optical fiber 80 multiplied by two. In the meantime, the previously described grooves 58 formed in the second radial protrusion 54 have a width sufficient to accommodate the diameter of the optical fiber 80 (Tij, Rij) as indicated in FIG. 15. Further, the grooves 60 also formed in the second protrusion 54 have a width sufficient to accommodate the diameter of the optical fiber 80 multiplied by three, and a depth sufficient to accommodate the diameter of the fiber 80 multiplied by two. Namely, each of the grooves 60 is dimensioned to permit the second ends of the light-receiving optical fibers Rij to be arranged in two rows, three in the bottom row and two in the top row, as indicated in FIG. 15.

The grooves 56, 58 and 60 have guide portions defined by tapered surfaces 94, 96 and 98, respectively, as indicated in FIG. 15. These guide portions 94, 96, 98 are open in the top surface of the radial protrusions 52, 54, so that the width of the guide portions decreased from the top surface of the protrusions toward the bottom of the grooves 56, 58, 60. The guide portions 94, 96, 98 facilitate the positioning of the optical fiber 80 into the grooves 56, 58, 60 when the optical fiber 80 is wound on the cylinder 82.

The body 36 has the previously indicated tab 37 which is formed on its surface 48, near the first radial protrusion 52, so as to extend parallel to the protrusion 52. This tab 37 is adapted to contact the surface of the sheet 8, in order to maintain a suitable clearance between the tips of the optical fibers Tij, Rij and the surface of the sheet 8.

To wind the optical fiber 80 on the cylinder 82 of FIG. 11 for securing the optical fibers Tij and Rij on the arcuate surface 46 of the body 36 of the reading head 15, the body 36 is first fixed in the cutout 86 of the jig 84. The leading end of the optical fiber 80 is fixed to the jig 84, and the cylinder 82 is rotated by the drive shaft 92 in the direction indicated by arrow in FIG. 11, while at the same time the optical fiber 80 is supplied continuously through a guide 100. As the cylinder 82 is rotated, the guide 100 is reciprocated along the axis of the drive shaft 92, so that the optical fiber 80 is wound on the cylinder 82, that is, on the circumferential surface 91 of the jig 84 and the arcuate surface 46 of the body 36. In this process, the portions of the optical fiber 80 passing the first and second radial protrusions 52, 54 are accommodated in the grooves 56, 58, 60, as shown in FIGS. 14 and 15.

Subsequently, the portions of the optical fiber 80 accommodated in the grooves 56, 58, 60 are fixed with masses 102 of a suitable adhesive agent, as shown in FIGS. 14 and 15. In the next step, the optical fiber 80 is cut at the circumferential ends of the circumferential surface 91 of the jig 84, along the first and second radial protrusions 52, 54. More particularly, the jig 84 has relief portions 104 and 106 on the surfaces 86 and 88, respectively. These relief portions 104, 106 cooperate with the surfaces 48, 50 of the body 36 to define wedged gaps along the first and second radial protrusions 52, 54. In cutting the optical fiber 80, a cutter is moved into these wedged gaps. Since the dimension of the wedged gaps in the circumferential direction of the cylinder 82 is selected to be very small, the optical fiber 80 will not be damaged when it is cut.

Then, the body 36 is removed from the jig 84. Thus, the light-emitting optical fibers Tij, and the light-receiving optical fibers Rij are installed in position on the arcuate surface 46 of the body 36.

The previously indicated covering member 24 is bonded to the arcuate surface 46 of the body 36, so as to protect the optical fibers Tij and Rij against damage during grinding of the end faces of their first and second ends which protrude a small distance from the surfaces 48 and 50. The covering member 24 also protects the optical fibers Tij and Rij against damage during assembling of the body 36, shielding plate 38, printed wiring board 40 and the bottom casing 42.

While the present invention has been described in its preferred embodiment, it is to be understood that the invention is not confined to the arrangement of the illustrated embodiment, but may be otherwise embodied.

For example, although the each set of the optical fibers Tij and Rij consists of five fibers Tij and five fibers Rij, it is possible to change the number of the fibers Tij, Rij of each set.

Further, the pitch of the image-reading portions Dij may be suitably selected, preferably so that the pitch satisfies the previously indicated formula (1), and preferably so that the pitch is larger than the value "q" obtained from the formula (2).

Figure 16:
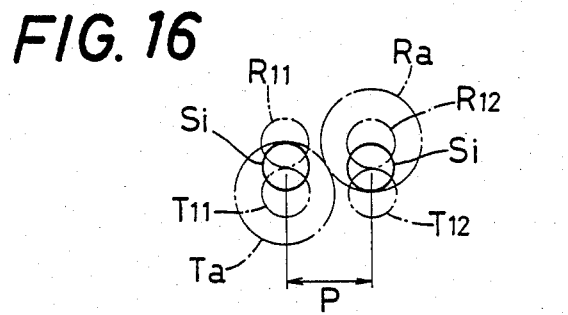
FIG. 16 is an illustration of a modified embodiment of the invention, showing a minimum pitch between the adjacent image-reading portions.

In the illustrated embodiment, the first ends of the corresponding optical fibers Tij and Rij constituting each image-reading portion Dij are disposed in the direction in which the image-reading portions Dij are spaced from each other (along the platen 2 or the second axis). However, it is possible that the first ends of the fibers Tij and Rij are disposed side by side on any straight line as long as the image-reading portions Dij or the overlapping spots (Si) are disposed along a straight line parallel to the line of movement of the reading head 15. For instance, the first ends of the corresponding light-emitting and light-receiving optical fibers Tij and Tij of each image-reading portion Dij may be disposed on a straight line perpendicular to the straight line (platen 2) along which the image-reading portions Dij are disposed, as indicted in FIG. 16. In this modified arrangement of the optical fibers Tij, Rij, a pitch p between the adjacent image-reading portions Dij should be greater than a value q which is determined by the following formula (3):

$$q = \sqrt{[r + 2l \cdot \tan(\alpha/2)]^2 - r^2} \quad (3)$$

where, r: diameter of the optical fibers Tij and Rij l: distance between the first ends of the fibers to the surface of the sheet 8

α: angle of radiation or incidence of the fibers

While the cam follower 19b is held by the spring 20 in pressed rolling contact with the circumferential surface of the cam 21, the cam follower 19b may be adapted to fit in a cam groove so that the cam follower 19b is reciprocated in the direction parallel to the platen 2 while the cam follower 19b is in sliding contact with the surfaces which define the cam groove.

Although the reading head 15 is continuously moved at a constant rate to read the reading spots Si as described referring to FIG. 10, it is possible that the reading operation is performed while the reading head 15 is moved along the platen 2 in an intermittent manner.

Figure 17:
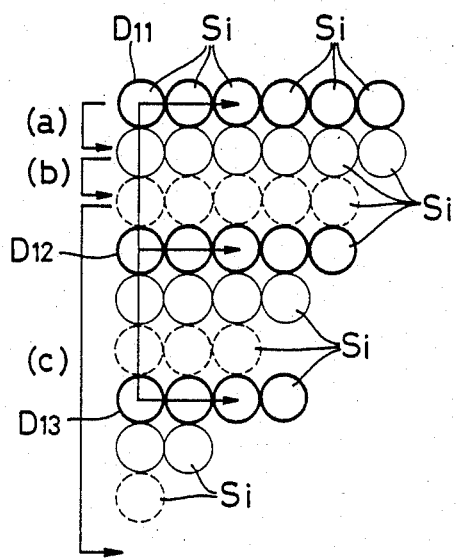
FIG. 17 is a view showing another modified embodiment of the invention wherein the image-reading portions are disposed along a line of movement of a recording medium.

Further, it is possible that the image-reading portions Dij of the reading head 15 are disposed along the line of movements of the sheet 8, i.e., along a straight line perpendicular to the line of movement of the reading head 15, as indicated in FIG. 17 (werein only the image-reading portions D11, D12 and D13 are indicted). In this case, the image-reading portions Dij are spaced from each other by a distance which is a multiple of the size of the reading spots Si. In operation, the reading head 15 is moved along the platen 2 continuously or intermittently, so that each image-reading portion Dij is moved horizontally (as indicated by arrows in FIG. 17), for example, at a pitch equal to the size of the reading spots Si, as indicated by circles in thick solid line. After the reading head 15 has been moved its predetermined stroke, the sheet 8 is fed in the direction across the platen 2, to position each image-reading portion Dij at the next row of the reading spots Si (indicated by circles in thin solid line) as indicated at (a) in FIG. 17. Then, the reading head 15 is moved again along the platen 2 to read that row of the reading spots Si. At the end of the movement of the reading head 15, the sheet 8 is again fed as indicated at (b) in FIG. 17, to position the image-reading portions Dij at the next row of the reading spots Si (indicated by circles in broken line). Subsequently, this row of the reading spots Si is read while the reading head 15 is moved in the same manner as described above. After all of the horizontal rows of the reading spots Si between the adjacent image-reading portions Dij have been read, the sheet 8 is fed across the platen 2 as indicated at (c) in FIG. 17, to position the reading head 15 at the next group of rows of the reading spots Si. Thus, the principle of the present invention may be practiced even when the image-reading portions Dij are disposed along a straight line perpendicular to the line of movement of the reading head 15.

Other changes, modifications and improvements may be made in the invention to those skilled in the art, within the scope of the present invention defined in the appended claims.

What is claimed is:

1. An optical reader for photoelectrically reading images on a surface of a recording medium, comprising:

a medium support for supporting said recording medium;

a reading head including (a) at least one light-emitting element, (b) at least one light-sensitive element, (c) a plurality of light-emitting optical fibers for transmitting beams of light form said at least one light-emitting element to emit said beams of light from their first ends to irradiate corresponding illumination spots on the surface of said recording medium, each of said first ends having a predetermined angle of radiation of light, and (d) a plurality of light-receiving optical fibers having first ends located adjacent to said first ends of the respective light-emitting optical fibers, said first ends of the light-receiving optical fibers having a predetermined angle of incidence of light and receiving the beams of light reflected from corresponding reflection spots on the surface of said recording medium, said light-receiving optical fibers transmitting the reflected light beams to said at least one light-sensitive element, said light-emitting optical fibers and said light-receiving optical fibers cooperating to constitute a plurality of reading units, and said first ends of the light-emitting and light-receiving optical fibers cooperating to constitute a plurality of image-reading portions, said at least one light-sensitive element producing an electric signal representative of a reflectance of light in an overlapping spot in which the illumination spot of each of said reading units overlaps the reflection spot of the same reading unit, said image-reading portions of said reading units being spaced apart from each other along a straight line at a predetermined pitch sufficient to prevent the illumination spot of one of said reading units from overlapping the reflection spot of the reading unit adjacent to said one reading unit;

driving means for moving said reading head and said recording medium relative to each other to move said overlapping spot along said straight line so that a substantially entire area along said straight line on said recording medium is covered by said overlapping spot; and control means for controlling said at least one light-emitting element and said at least one light-sensitive element, to read each of reading spots on said recording medium each time said overlapping spot is aligned with one of said reading spots.

2. An ooptical reader according to claim 1, wherein said driving means comprises a first feeding device for moving said recording medium along a first axis, and a second feeding device for moving said reading head along a second axis perpendicular to said one axis, said plurality of image-reading portions being spaced apart from each other along said second axis.

3. An optical reader according to claim 2, wherein the first ends of the light-emitting and light-receiving optical fibers of each of said reading units are disposed in a direction parallel to said second axis along, said predetermined pitch of said image-reading portions of the reading head being selected to be greater than a value q determined by the following formula:

$$q = 2r + 2l \cdot \tan(\alpha/2)$$

where,
r: diameter of said light-emitting and light-receiving optical fibers
l: distance between the first ends of said optical fibers and the surface of said recording medium
α: said angle of radiation or incidence of light of said first ends of the optical fibers.

4. An optical reader according to claim 2, wherein the first ends of the light-emitting and light-receiving optical fibers of each of said reading units are in a direction parallel to said first axis, said predetermined pitch of said image-reading portions of the reading head being selected to be greater than a value q determined by the following formula:

$$q = \sqrt{[r + 2l \cdot \tan(\alpha/2)]^2 - r^2}$$

where,
r: diameter of said light-emitting and light-receiving optical fibers
l: distance between the first ends of said optical fibers and the surface of said recording medium
α: said angle of radiation or incidence of light of said first ends of the optical fibers.

5. An optical reader according to claim 2, wherein said second feeding device moves said reading head at a constant rate over at least a predetermined distance along said second axis, said at least one light-emitting element consisting of a plurality of light-emitting elements which are positioned opposite to second ends of the corresponding light-emitting optical fibers which have said first ends opposite to the surface of the recording medium, said at least one light-sensitive element consisting of a single light-sensitive element which is positioned opposite to second ends of all of said light-receiving optical fibers which have said first ends opposite to the surface of the recording medium, said predetermined pitch of said image-reading portions of said reading head being determined by the following formula:

$$p = a/N - 1/xN$$

where,
a: number of said overlapping spots which is formed by each image-reading portion while the reading head is moved over said predetermined distance
1/N: size of said overlapping spot along said second axis (N = number of said overlapping spots per unit distance)
x: number of the light-receiving optical fibers opposite to said single light-sensitive element,
one of said image-reading portions of the reading head reading one of said reading spots sequentially each time said reading head is moved by a distance of 1/xN.

6. An optical reader according to claim 5, wherein said reading head comprises a plurality of groups of said reading units each unit having said single light-sensitive element opposite to said second ends of said light-receiving optical fibers, said groups of reading units being disposed along said second axis, the corresponding image-reading portions of said groups of reading units reading the respective reading spots each time said reading head is moved by said distance of 1/xN.

7. An optical reading according to claim 5, wherein said second feeding device comprises:
a carrier supporting said reading head and movable along said second axis;
a cam rotatably supported by a stationary member;
a drive motor for rotating said cam;
a cam follower attached to said carrier and movable with the carrier; and
said cam having a profile which enables said carrier to effect reciprocating motions including a motion of said predetermined distance at said constant rate.

8. An optical reader according to claim 7, wherein said control means comprises:
a rotary disk rotatable with said cam and having a plurality of slits which are formed in spaced-apart relation with each other in a circumferential direction of the rotary disk; and
a photoelectric sensor disposed in the proximity of said rotary disk and producing a timing signal when each of said slits passes said photoelectric sensor during rotation of said rotary disk, said control means controlling the operations of said plurality of light-emitting elements and said single light-emitting element, in response to said timing signal.

9. An optical reader according to claim 8, wherein said control means activates selectively said plurality of light-emitting elements to emit the beams of light when the image-reading portions of the corresponding reading units are positioned opposite to the respective reading spots on the recording medium, said control means holding said single light-sensitive element in its operative position.

10. An optical reading according to claim 1, wherein said reading head comprises:

a body of a substantially sectorial transverse cross sectional shape, having an arcuate surface corresponding to an arc of a circle, and two substantially flat surfaces which cooperate with said arcuate surface to define a sector of said circle in transverse cross section of said body;

said body having a pair of radial protrusions which extend along opposite ends of said arcuate surface parallel to a centerline of said circle, each of said radial protrusions having a plurality of grooves formed in a circumferential direction of said body, said first ends of said light-emitting and light-receiving optical fibers being accommodated and fixed in said grooves in one of said radial protrusions, and second ends of the optical fibers opposite to said first ends being accommodated and fixed in said grooves in the other of said radial protrusions, and a covering member covering said light-emitting and light-receiving optical fibers and said arcuate surface of said body.

11. An optical reader according to claim 10, wherein each of said grooves has a guide portion which is open in a top surface of the radial protrusion, a width of said guide portion is measured along the radial protrusion decreasing in a direction from said top surface toward a bottom of said groove.

12. An optical reader according to claim 10, wherein said at least one light-emitting element and said at least one light-sensitive element are fixed on a single printed wiring board which is positioned relative to said body of the reading head such that said at least one light-emitting element and said at least one light-sensitive element are located adjacent to said second ends of said light-emitting and light-receiving optical fibers which are fixed in said grooves in said one of the radial protrusions.

13. An optical reader according to claim 12, wherein a shielding plate is provided between said body of the reading head and said printed wiring board, said shielding plate having a plurality of apertures formed therethrough to accommodate said at least one light-emitting element and said at least one light-sensitive element, said shielding plate preventing leakage of said beams of light from said at least one light-emitting element, and preventing said at least one light-sensitive element from receiving light beams other than said reflected light beams transmitted through said light-receiving optical fibers.

14. An optical reader according to claim 2, wherein said at least one light-emitting element consists of a plurality of light-emitting elements which are positioned opposite to second ends of the corresponding light-emitting optical fibers which have said first ends opposite to the surface of said recording medium, said medium support comprising a paper holder which has a length along said second axis, sufficient to cover all of said image-reading portions of said reading head, and which has a surface having a predetermined reflectance of light, and wherein said control means comprises:

a control circuit for selectively activating said light-emitting elements and controlling an amount of the light beams emitted by said light-emitting elements;

first commanding means for storing plural sets of quantitative data representative of different input levels of each of said light-emitting elements, said first commanding means applying said sets of quantitative data one after another to said control circuit;

judging means for detecting a variation in an output level of said at least one light-sensitive element, due to change in the input level of said each light-emitting element, and for determining whether said output level of said at least one light-sensitive element has reached a predetermined reference value;

memory means for storing the quantitative data of said each light-emitting element which is applied to said control circuit when said output level of the corresponding light-sensitive element has reached said reference value; and second commanding means for applying the quantitative data stored in said memory means, to said control circuit to activate said each light-emitting element based on the stored quantitative data, upon reading of the reading spots.

15. An optical reader according to claim 14, wherein said paper holder is made of a metallic material.

16. An optical reader for photoelectrically reading images on a surface of a recording medium, comprising:

a medium support for supporting said recording medium;

a reading head including (a) a plurality of light-emitting elements, (b) a light-sensitive element, (c) a plurality of light-emitting optical fibers having first ends opposite to the surface of the recording medium, and second ends opposite to said light-emitting elements, respectively, said light-emitting optical fibers transmitting beams of light from said light-emitting elements to emit said beams of light from said first ends to irradiate corresponding illumination spots on the surface of said recording medium, each of said first ends having a predetermined angle of radiation of light, and (d) a plurality of light-receiving optical fibers having first ends located adjacent to said first ends of the respective light-emitting optical fibers, and second ends positioned opposite to said light-sensitive element, said first ends of the light-receiving optical fibers having a predetermined angle of incidence of light and receiving the beams of light reflected from corresponding reflection spots on the surface of said recording medium, said light-receiving optical fibers transmitting the reflected light beams to said light-sensitive element, said light-emitting optical fibers and said light-receiving optical fibers cooperating to constitute a plurality of reading units, and said first ends of the light-emitting and light-receiving optical fibers cooperating to constitute a plurality of image-reading portions, said light-sensitive element producing an electric signal representative of a reflectance of light in an overlapping spot in which the illumination spot of each of said reading units overlaps the reflection spot of the same reading unit; and a first feeding device for moving said recording medium along one axis;

a second feeding device for moving said reading head along a second axis perpendicular to said one axis, at a constant rate over at least a predetermined distance;

control means for controlling said light-emitting element and said light-sensitive element, to read each of reading spots on said recording medium each time said overlapping spot is aligned with one of said reading spots, while said overlapping spot is moved along said second axis during movement of said reading head at said constant rate, said plurality of image-reading portions being spaced apart from each other along said second axis at a pitch which is determined by the following formula:

$$p = a/N - 1/xN$$

where,
a: number of said overlapping spots which is formed by each image-reading portion while the reading head is moved over said predetermined distance
1/N: size of said overlapping spot along said second axis (N = number of said overlapping spots per unit distance)
x: number of the light-receiving optical fibers opposite to said single light-sensitive element, one of said image-reading portions of the reading head reading one of said reading spots sequentially each time said reading head is moved by a distance of 1/xN.

17. A reading head for an optical reader for photoelectrically reading images on a surface of a recording medium, comprising:
at least one light-emitting element;
at least one light-sensitive element;
a plurality of light-emitting optical fibers having first ends opposite to the surface of the recording medium, and second ends opposite to said at least one light-emitting element, for transmitting beams of light from said at least one light-emitting element to emit said beams of light toward the surface of the medium;
a plurality of light-receiving optical fibers having first ends located adjacent to said first ends of the respective light-emitting optical fibers, and second ends opposite to said at least one light-sensitive element, for transmitting the light beams reflected from the medium surface to said at least one light-sensitive element;
a body of a substantially sectorial transverse cross sectional shape which is obtained by cutting a cylindrical blank in two planes which include an axis of the blank, said body having an arcuate surface corresponding to an arc of a circumference of said cylindrical blank, said body having a pair of radial protrusions which extend along opposite ends of said arcuate surface parallel to a centerline of said circle, each of said radial protrusions having a plurality of grooves formed in a circumferential direction of said body, said first ends of said light-emitting and light-receiving optical fibers being accommodated and fixed in said grooves in one of said radial protrusions, and second ends of the optical fibers opposite to said first ends being accommodated and fixed in said grooves in the other of said radial protrusions; and
a covering member covering said light-emitting and light-receiving optical fibers and said arcuate surface of said body.

18. An optical reader for photoelectrically reading images on a surface of a recording medium, comprising:
a reading head including (a) a plurality of light-emitting elements; (b) at least one light-sensitive element; (c) a plurality of light-emitting optical fibers having first ends opposite to the surface of said recording medium, said light-emitting optical fibers transmitting beams of light from the respective light-emitting elements to emit said beams of light from said first ends thereof toward the surface of the medium; (d) a plurality of light-receiving optical fibers having first ends located adjacent to said first ends of the respective light-emitting optical fibers, said light-receiving optical fibers transmitting the light beams reflected from the surface of said recording medium to the respective light-emitting elements, said first ends of said light-emitting and light-receiving optical fibers cooperating to constitute a plurality of image-reading portions which are spaced apart from each other along a straight line;
a medium holder for supporting said recording medium, said medium holder having a length along said straight line, sufficient to cover all of said image-reading portions of said reading head, and which has a surface having a predetermined reflectance of light; and
a first feeding device for moving said recording medium along an axis perpendicular to said straight line;
a second feeding device for moving said reading head along a second axis parallel to said straight line;
a control circuit for selectively activating said light-emitting elements and controlling an amount of the light beams emitted by said light-emitting elements;
first commanding means for storing plural sets of quantitative data representative of different input levels of each of said light-emitting elements, said first commanding means applying said sets of quantitative data one after another to said control circuit;
judging means for detecting a variation in an output level of said at least one light-sensitive element, due to change in said input level of said each light-emitting element, and for determining whether said output level of said at least one light-sensitive element has reached a predetermined reference value;
memory means for storing the quantitative data of said each light-emitting element which is applied to said control circuit when said output level of the corresponding light-sensitive element has reached said reference value; and
second commanding means for applying the quantitative data stored in said memory means, to said control circuit to activate said each light-emitting element based on the stored quantitative data, upon reading of the reading spots.

* * * * *